(12) United States Patent
Sudhir et al.

(10) Patent No.: US 12,124,935 B2
(45) Date of Patent: Oct. 22, 2024

(54) NEURAL PROCESSING SYSTEM

(71) Applicant: Arm Limited, Cambridge (GB)

(72) Inventors: Suraj Sudhir, San Jose, CA (US);
Jayavarapu Srinivasa Rao, Cambridge (GB); Rune Holm, Cambridge (GB)

(73) Assignee: Arm Limited, Cambridge (GB)

( * ) Notice: Subject to any disclaimer, the term of this patent is extended or adjusted under 35 U.S.C. 154(b) by 543 days.

(21) Appl. No.: 16/797,210

(22) Filed: Feb. 21, 2020

(65) Prior Publication Data

US 2021/0224630 A1    Jul. 22, 2021

Related U.S. Application Data

(63) Continuation-in-part of application No. 16/748,375, filed on Jan. 21, 2020, now abandoned.

(51) Int. Cl.
*G06F 7/57* (2006.01)
*G06N 3/04* (2023.01)

(52) U.S. Cl.
CPC ............ *G06N 3/04* (2013.01); *G06F 7/57* (2013.01)

(58) Field of Classification Search
CPC .......... G06N 3/04; G06N 3/0454; G06N 3/10; G06F 7/57
See application file for complete search history.

(56) References Cited

U.S. PATENT DOCUMENTS

2018/0173571 A1* 6/2018 Huang ................. G06F 9/5044

OTHER PUBLICATIONS

Judd et al. ("Stripes: Bit-Serial Deep Neural Network Computing", 2016 49th Annual IEEE/ACM International Symposium on Microarchitecture (MICRO), 2016, pp. 1-12) (Year: 2016).*
Chen et al. ("DeepLab: Semantic Image Segmentation with Deep Convolutional Nets, Atrous Convolution, and Fully Connected CRFs", IEEE Transactions on Pattern Analysis and Machine Intelligence, vol. 30, No. 4, Apr. 2018, pp. 834-848, 2014, pp. 260-264) (Year: 2018).*
Luo et al. ("DaDianNao: A Neural Network Supercomputer", IEEE Transactions on Computers, vol. 66, No. 1, Jan. 2017, pp. 73-88) (Year: 2017).*

(Continued)

*Primary Examiner* — Markus A. Vasquez
(74) *Attorney, Agent, or Firm* — EIP US LLP

(57) ABSTRACT

A computer-implemented method, performed in a neural processing system comprising control processor circuitry and arithmetic logic circuitry, of performing a convolution between an input feature map (IFM) and convolutional filter data, resulting in an output feature map (OFM). The method includes, obtaining in the control processor circuitry, dimensional characteristic parameters relating to dimensions of input work batch data arrays and positional characteristic parameters relating to positions of feature map content within the input work batches. The method also includes, in the arithmetic logic circuitry, performing convolutions between the input work batches, generated from the IFM based on the dimensional characteristic parameters and the positional characteristic parameters, and work batch filter data arrays corresponding to the filter to produce a plurality of output work batch data arrays. The plurality of output work batches are combined to generate an OFM.

16 Claims, 35 Drawing Sheets

(56) References Cited

OTHER PUBLICATIONS

12. Alaeddine et al. ("A Pipelined Energy-efficient Hardware Acceleration for Deep Convolutional Neural networks", 2019 IEEE Conference on Design and Test of Integrated Micro and Nano-Systems (DTS), Apr. 2019, pp. 1-6) (Year: 2019).*

Erdem et al. ("Design Space Exploration for Orlando Ultra Low-Power Convolutional Neural Netwwork SoC", 2018 IEEE 29th International Conference on Application-specific Systems, Architectures and Processors (ASAP), 2018, pp. 1-7) (Year: 2018).*

Kalle Ngo ("FPGA Hardware Acceleration of Inception Style Parameter Reduced Convolution Neural Networks," Degree Project in Information and Communication Technology, Kth Royal Institute of Technology School of Information and Communication Technology, 2017) (Year: 2017).*

* cited by examiner

IFM

IFM

Filter

Filter

IFM with padding

Upsampled IFM with padding

904a

904b

910

OWB 1,2

OWB 3,4

OWB 1, 2, 3, 4

OFM

Sub-IFM 1:

1204

Filter 1:

1205

Sub-IFM 2:

1207

Filter 2:

1208

Sub-IFM 3:

1210

Filter 3:

1211

Sub-IFM 4:

1213

Filter 4:

1214

1301a

1301b

1302a

1302b

1302c

NEURAL PROCESSING SYSTEM

CROSS-REFERENCE TO RELATED APPLICATIONS

This application is a continuation-in-part under 35 U.S.C. § 120 of U.S. application Ser. No. 16/748,375 filed Jan. 21, 2020. The above reference patent application is incorporated by reference in its entirety.

BACKGROUND OF THE INVENTION

Field of the Invention

The present disclosure relates to methods, apparatus and computer software for managing data processing in a neural processing system. The disclosure has particular, but not exclusive, relevance to the management of data processing within a neural processing unit (NPU).

Description of the Related Technology

Neural processing systems may contain a neural processing unit (NPU). NPUs, also known as neural processors, neural network accelerators and AI accelerators, are used to accelerate machine learning algorithms. By including specialized electronic circuitry designed for one or more specified neural network architectures, NPUs process input data, such as image data, more efficiently than general purpose processors. Many neural networks contain convolutional layers, where an input feature map (IFM) is convolved with convolutional filter data to produce an output feature map (OFM). These layers often consume a large amount of processing. NPUs or accelerators may be targeted to perform this area of computation efficiently. Neural networks also contain other layer types such as input, output, recurrent neural network, deconvolution, pooling, and fully connected. A CNN typically contains multiple convolution layers, with the OFM of one layer often being used as the IFM of the next layer.

SUMMARY

According to a first aspect of the present disclosure, there is provided a computer-implemented method, performed in a neural processing system comprising control processor circuitry and arithmetic logic circuitry, of performing a convolution between an input feature map and convolutional filter data, resulting in an output feature map, the method comprising:
  obtaining, in the control processor circuitry:
    one or more dimensional characteristic parameters relating to dimensions of each of a plurality of input work batch data arrays corresponding to the convolution to be performed; and
    one or more positional characteristic parameters relating to positions of feature map content within the plurality of input work batch data arrays; and
  performing, in the arithmetic logic processing circuitry, convolutions between:
    the plurality of input work batch data arrays, generated from the input feature map based at least in part on the one or more dimensional characteristic parameters and the one or more positional characteristic parameters; and
    one or more work batch filter data arrays corresponding to the convolutional filter data,
  to produce a plurality of output work batch data arrays which may be combined to generate an output feature map.

The one or more positional characteristic parameters relating to positions of feature map content within the plurality of input work batch data arrays may include feature map edge identification. Avoiding fetching content from memory that lies outside the coordinate space of the feature map which would result in generation of an invalid output. Neural processing systems may use CNN convolutional operation modes, including one or more of feature map striding, filter dilation, feature map resampling (including upsampling and downsampling) and other modes. Performing edge identification considering all these modes is significantly more efficient in the control processor circuitry and reduces complexity relative to a purely hardware-based mechanism implemented in the arithmetic logic processing circuitry, resulting in an advantageous reduction in on-chip logic components which take up space on a chipset while reducing power consumption.

According to a second aspect of the present disclosure there is provided neural processing system comprising:
  storage circuitry arranged to store an input feature map, convolutional filter data, and an output feature map;
  control processor circuitry arranged to obtain:
    one or more dimensional characteristic parameters relating to dimensions of each of a plurality of input work batch data arrays corresponding to the convolution to be performed; and
    one or more positional characteristic parameters relating to positions of feature map content within the plurality of input work batch data arrays; and
  arithmetic logic processing circuitry arranged to perform convolutions between:
    the plurality of input work batch data arrays, generated from the input feature map based at least in part on the one or more dimensional characteristics and the one or more positional characteristics; and
    one or more work batch filter data arrays corresponding to the convolutional filter data,
    to produce a plurality of output work batch data arrays which may be combined to generate an output feature map.

According to a third aspect there is provided a non-transitory computer-readable storage medium comprising a set of computer-readable instructions stored thereon which, when executed by at least one processor, cause the at least one processor to output data for controlling the performance of convolutions by:
  receiving convolution configuration data relating to a convolution to be performed;
  determining from the convolution configuration data:
    one or more dimensional characteristic parameters relating to dimensions of each of a plurality of input work batch data arrays corresponding to the convolution to be performed; and
    one or more positional characteristic parameters relating to positions of feature map content within the plurality of input work batch data arrays; and
    outputting data for controlling the performance of a convolution between an input feature map and convolutional filter data, based at least in part on the one or more dimensional characteristics and the one or more positional characteristics.

Further features and advantages will become apart from the following description of preferred embodiments, given by way of example only, which is made with reference to the accompanying drawings.

DETAILED DESCRIPTION OF CERTAIN INVENTIVE EMBODIMENTS

Figure 1:
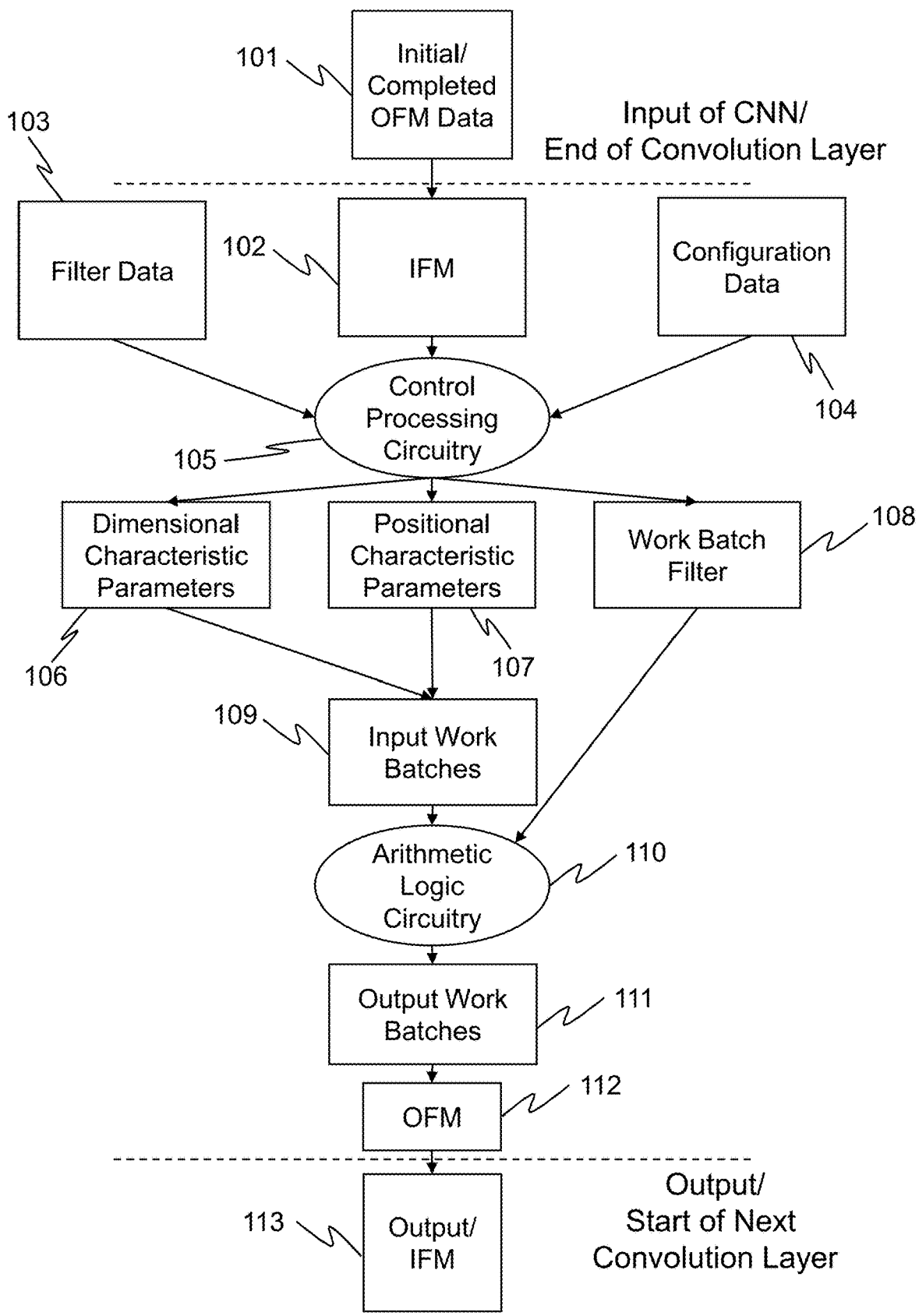
FIG. 1 illustrates a schematic diagram representing a method of performing convolutions in a layer of a convolutional neural network.

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

It is desirable to reduce the current complexity of the hardware logic components contained in the neural processing units (NPUs) contained within neural processing systems which have been used to perform complex logical operations during a combination of convolutional operation modes between input feature maps (IFMs) and convolutional filter data to produce output feature maps (OFMs). It is also desirable to reduce the number of memory accesses which are made to fetch data stored in storage devices. Memory accesses to static random-access memory (SRAM), dynamic random access (DRAM) or another storage circuitry type containing data, made to fetch portions of an IFM or convolutional filter data to be stored in a data buffer for convolution, consume power. Reducing the number of memory accesses to storage circuitry reduces the power consumption of the neural processing system. The convolutional operation mode may include feature map striding, filter dilation, feature map upsampling, feature map downsampling and other modes. The complexity of hardware logic components is reduced through the implementation of a software-hardware mechanism. The software-hardware mechanism comprises software which is used to analyze data to determine how the data is sent to the hardware for convolution. The software-hardware mechanism leverages the software's global view of the IFM, even though the hardware may only be aware of the section of the IFM it is currently processing. The software comprises of a set of instructions stored in storage circuitry, which when executed allow the control processor circuitry to carry out a number of processes. The control processor circuitry may be contained in a central processing unit (CPU) of the described system. The control processor circuitry may also be contained in a neural control unit (NCU) of the described system. The software allows the control processor circuitry to utilize a global view of the IFM, the current state of the feature map processing, the position of the current batch of work within the overall IFM and the combination of convolutional operation modes being executed, to program a set of parameters used by the hardware to perform the batches of work. The dimensions of the batches of work can be selected to optimize the number of memory accesses to storage circuitry where they are stored to reduce the neural processing systems power consumption. The software-hardware mechanism allows for the reduction of complex logic components contained within the hardware to independently carry out the convolutional operation modes. Enabling the control processor circuitry to provide this information also enhances the flexibility of the described system as the software can be easily modified.

FIG. 1 illustrates a schematic diagram depicting the software-hardware mechanism used to perform convolutions between an IFM 102 and filter data 103 to produce an OFM 112 as part of a layer of a convolutional neural network (CNN). In one example the current layer is the input layer of the CNN and initial input data 101 becomes the IFM 102 of the current layer. The IFM 102 is input data which may be image data comprised of an array of pixel values which is convolved with a convolutional filter data 103 to highlight features contained within the image data. In another example the current layer is an intermediate layer, and the completed OFM data 101 of a previous layer is used as the IFM 102 of the current layer. The IFM 102 may comprise an array of values with a height, a width and a depth (x x y x z). The current layer of the CNN also has associated filter data 103 which is to be convolved with the IFM 102 to produce the OFM 112. The filter data 103 may be an array of values which when convolved with image data, processes the image data to highlight features contained within the image data. The filter data 103 may also comprise an array of values with a height, a width and a depth (x x y x z). The IFM 102 and filter data 103 will most commonly have the same depth value. In the examples set out in this disclosure, the depth of the IFM 102 and filter data 103 is equal to one, however it will be appreciated that the concepts disclosed in examples will extend to the depth of the IFM 102 and filter data 103 being of a value larger than one. The IFM 102 and filter data 103 may be stored in storage circuitry such as DRAM, SRAM or another storage circuitry type.

A layer of the CNN also has associated convolution configuration data 104. The configuration data 104 may relate to target dimensions of the OFM 112 for the current layer of the CNN. The target dimensions of the OFM 112 may reflect the dimensions of the IFM 102 of the next layer. In one example, the IFM 102 and OFM 112 are image data and the target dimensions of the OFM 112 indicate an improvement in image resolution that will be used by the next convolutional layer to process the image data further. The target OFM 112 dimensions may be used by control processor circuitry 105 to determine the configuration data 104. The target dimensions of the OFM 112 may also comprise an array of values with a height, a width and a depth (x x y x z). The configuration data 104 may contain identifiers which indicate a convolutional operation mode to be performed to produce the OFM 112 with the target dimensions. The configuration data 104 identifiers may indicate the type of padding used by the IFM 102, the stride of the filter data 103 across the IFM 102 and how much to upsample the IFM 102 by.

The configuration data 104 may be determined by the CNN or input by a user. The configuration data 104 may be input by a user, using a computer communicatively coupled to the described system. In one example, the configuration data 104 is used to determine the target dimensions of the OFM 112. The configuration data 104 may include a convolutional operation mode. The configuration data 104 may, in the alternative, or in addition, contain information about the memory capacity of the storage circuitry contained within the described system which can be used to determine the number and dimensions of output work batch data arrays (referred to herein as output work batches) 111. The configuration data 104 may also contain a data buffer size which relates to an amount of storage capacity which has been set aside in storage circuitry for data to be placed in to be accessed during processing. The configuration data 104 may be used to determine the optimal data buffer size. The output work batches 111 may be sections or partial results of the OFM 112 which may be combined or accumulated to construct the OFM 112 or another partial result. The partial results produced may undergo further processing. In the examples set out in this disclosure, the depth of the output work batches 111 is equal to one. It will be appreciated however, that the number and dimensions of the output work batches 111 may be selected such that the output work batches may have depth dimensions indicative that they comprise sections of the depth of the OFM 112. The target dimensions of the output work batch 111 can also be used by the control processor circuitry 105 to determine the dimensions of the input work batch data arrays (referred to herein as input work batches) 109. In the examples set out in this disclosure, the depth of the input work batches 109 is equal to one, following on from the depth of the output work batches 111 being equal to one. It will be appreciated however, that the number and dimensions of the input work batches 109 may have depth dimensions indicative that they are sections of the depth of the IFM 102. The number and dimensions of output work batches 111 may also be determined by taking into consideration the number of memory accesses which will be made to fetch input work batches 109 and work batch filters 108 from the storage circuitry where the IFM 102 and filter data 103 are stored, to be stored in a data buffer for calculation of the output work batches 109 and how these dimensions can be optimized to reduce power consumption of the neural processing system. An input work batch 109 may be comprised of sections or partials of the IFM that the control processor circuitry 105 has determined can be processed together in batches. The configuration data 104 may also be stored in storage circuitry such as DRAM, SRAM or another storage circuitry type.

The control processor circuitry 105 is constructed to execute software which has access to the IFM 102, filter data 103 and configuration data 104 contained in storage circuitry. The software is in the form of a set of instructions, which when executed by the control processor circuitry 105 allow the control processor circuitry 105 to carry out certain processes. The control processor circuitry 105 may determine work batches that the convolution between the IFM 112 and filter data 103 can be split up into by taking into account the configuration data 104. The control processor circuitry 105 may determine the work batches depending on the memory capacity of storage circuitry contained within the described system. The control processor circuitry 105 may determine the number and dimensions of work batches to optimize the number of memory accesses made to storage circuitry to perform processing operations in an effort to improve the amount of power consumed by the neural processing system. The control processor circuitry 105 may determine dimensional characteristic parameters 106 and positional characteristic parameters 107. Dimensional characteristic parameters 106 may include dimensions of input work batches 109. Positional characteristic parameters 107 may include left and top padding values which are used to indicate how much padding is to be added to the left of and above an input work batch 109 respectively. Positional characteristic parameters 107 may also include right and bottom delta values which are used to indicate the extent of the IFM 102 used by the input work batch 109 to complete the convolutions to construct the OFM 112. Left padding values, top padding values, right delta values and bottom delta values are collectively referred to as edge elements. A padding area or edge elements, may be included to the top, bottom, left or right of the input work batch using either one or more rows of elements in the case of top or bottom padding values, or a plurality of columns of elements in the case of left or right padding values. The padding area may have IFM content or zero values depending on the location of the input work batch 109 relative to the IFM 102, which determines whether, in the positions of elements of the padding area, values are derived from the IFM 102 or not. If IFM content is not available, the padding area is filled with zero values. The dimensional characteristic parameters 106 and positional characteristic parameters 107 are used to generate input work batches 109, as is demonstrated in various examples throughout the present disclosure.

The input work batches 109 may be constructed using contiguous elements of the IFM 102 or the IFM 102 may be subsampled to construct the input work batches 109. In one example the input work batches 109 are generated by the control processor circuitry 105 by retrieving the IFM data from where it is stored in the storage circuitry of the described system and storing it in a data buffer. These input work batches are then sent from the data buffer to arithmetic logic circuitry 110 for convolution. The arithmetic logic circuitry may be composed of digital circuitry which is used to perform arithmetic and logic operations. In another example the input work batches 109 are generated using arithmetic logic circuitry 110 which retrieves the data from where it is stored in the storage circuitry of the described system and places it in a data buffer for convolution. The control processor circuitry 105 may also determine, using the configuration data 104, IFM 102 and filter data 103, work batch filter data arrays (referred to herein as work batch filters) 108 which are sections or partials of the filter data 103 which can be used to perform sections of the convolutions to determine partial results which are combined or accumulated to determine the OFM 112 or further partial results. These partial results may undergo further processing. The work batch filters are also fetched into the data buffer for convolution. The input work batches and work batch filters may be fetched to the data buffer in such a manner that associated input work batches and work batch filters which are to be convolved together, are fetched together so that they are associated. Arithmetic logic circuitry 110 is instructed to perform convolutions between the input work batches 109 and work batch filters 108 to compute output work batches 111. The output work batches 111 can then be combined or accumulated to determine the OFM 112 or further partial results which may undergo further processing. The OFM 112 can be output, or used as the IFM 113 of the next convolutional layer. If output, the OFM 112 may be fed into a different kind of layer in a CNN, for example a fully connected layer, before a result of the neural network processing is output from the CNN.

The software may be used to analyze properties of the neural network and associated operations such as the storage circuitry capacity, the data buffer size, the filter dimensions, IFM dimensions, configuration data such as the number of elements the filter strides across the IFM or the dilation of the filter and the number and dimensions of output work batches and input work batches in order to determine various processing metadata. This processing metadata may be used to optimize the number and dimensions of input work batches, output work batches, number of memory accesses and size of data buffer used during processing.

FIGS. 2a-2k are used to illustrate the inputs and results of different stages of the method used by the software-hardware mechanism for performing a convolution between a convolutional filter and an IFM in accordance with a first example of the present disclosure. The configuration data in this example indicates a convolution with a 'SAME' padding setting. The 'SAME' padding setting introduces extra rows and/or columns of elements around the IFM to ensure the computation of an OFM with equal dimensions to the IFM.

Figure 2A:
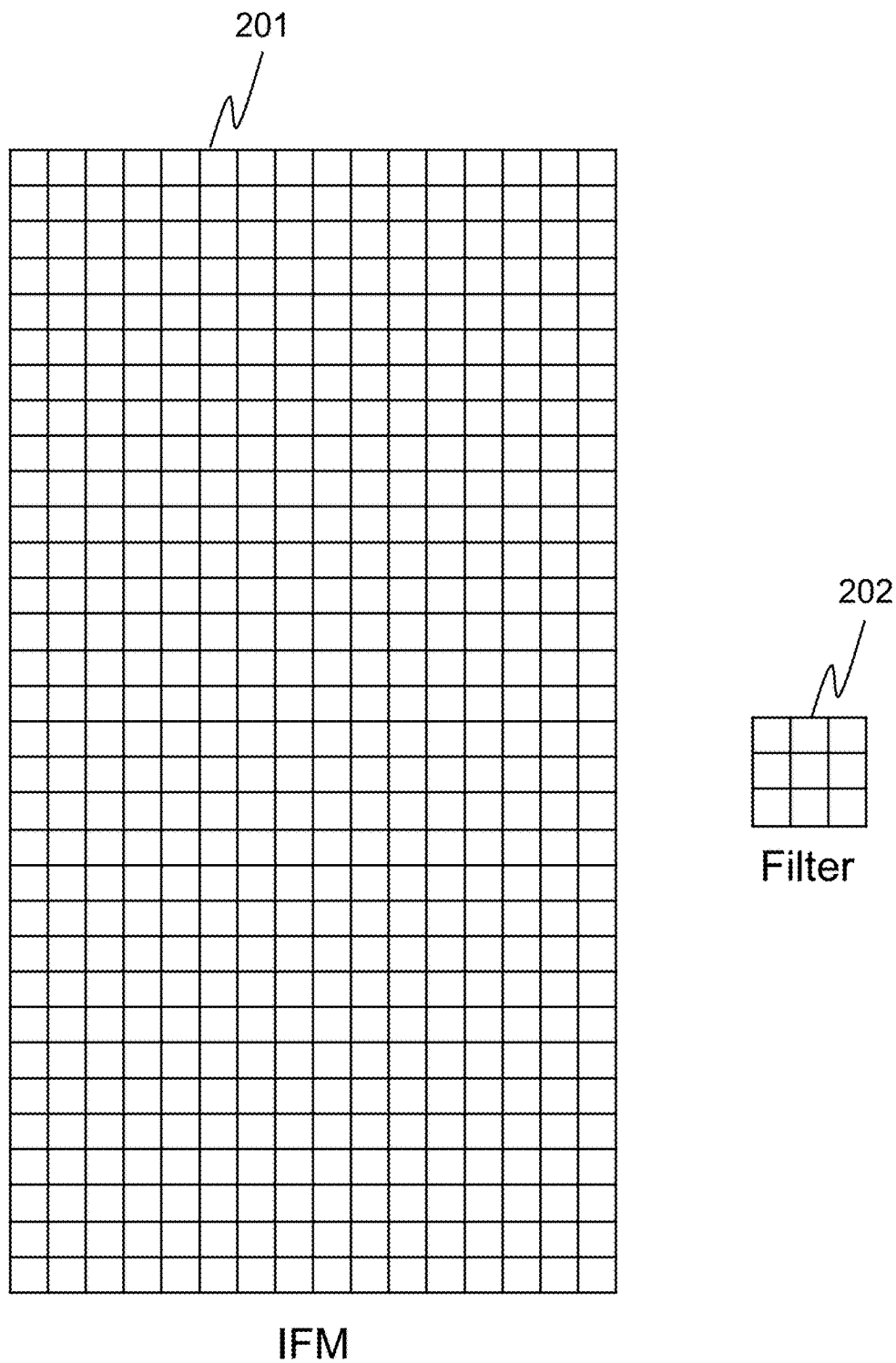
FIGS. 2a to 2k illustrate features of a method used by a software-hardware mechanism in accordance with a first example of the present disclosure.

FIG. 2a illustrates the IFM 201 and filter 202 associated with the current convolution layer of the present example. The IFM 201 has dimensions 32 elements high (h) by (x) 16 elements wide (w). The filter 202 in this example has dimensions 3h×3w. The current convolutional layer has target OFM dimensions 32h×16w as part of the configuration data. The target OFM dimensions may be input by a user using a computer which is communicatively coupled to the described system or they may be determined by the CNN. In one example, the control processor circuitry uses the target dimensions of the OFM to determine other configuration data. Since the target dimensions of the OFM are the same as the IFM 201, the control processor circuitry may determine that the 'SAME' padding setting is used and create an indicator as part of the configuration data. The control processor circuitry may also determine that during convolution the filter strides one element of the IFM at a time and the IFM is not upsampled. The control processor circuitry may also generate indicators reflecting the convolutional operation mode as part of the configuration data. In another example the other configuration data for the convolutional layer is input by a user using a computer which is communicatively coupled to the described system. In a further example, the other configuration data are determined by the CNN. The control processor circuitry may also be aware of the memory capacity of the memory components of the described system and the number of memory accesses to be made to storage circuitry in order to retrieve data to perform various processes with different dimensions of work batches. This information may be used to determine the number and dimensions of the output work batch. In the present example, the dimensions of the OFM are 32h×16w and the memory capacity and number of memory accesses are as such that the OFM is formed using two output work batches of 16h×16w. The number and dimensions of the output work batches inform the number and dimensions of the input work batches when also considering the work batch filter. In the present example the control processor circuitry determines that the work batch filter will be of the same dimensions as the filter 3h×3w and therefore two input work batches of 18h×18w are used for the convolution.

Figure 2B:
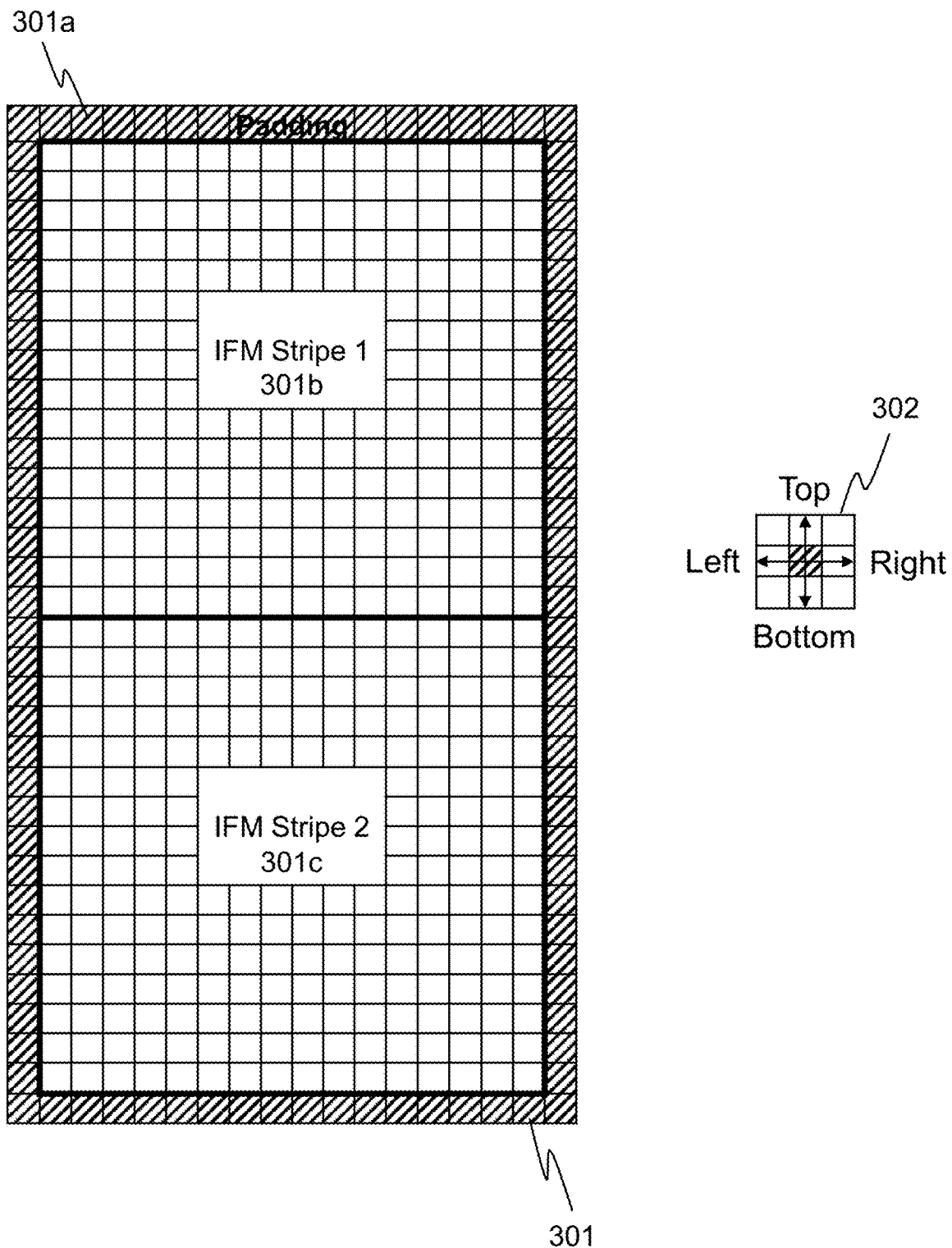

As shown in FIG. 2b, the control processor circuitry has a global view of the IFM 201, including any extra elements to be used for the convolution. The extra elements in this case are due to the 'SAME' padding setting. The control processor circuitry is thus aware of a setting corresponding to padding to be used by the IFM 301 during the convolution to produce the OFM with the target dimensions. In the present example, the global view of the IFM processing includes overall padding areas which will have zero values, as indicated by the hatched cells 301a. It should be noted that unless otherwise specified, the hatched cells in all diagrams represent padding areas with zero values. As the control processor circuitry has determined that the OFM can be constructed by generating two output work batches, the control processor circuitry may split the IFM 301 into two equal work batches, also referred to as stripes, with dimensions 16h×16w, a first IFM stipe 301b, and a second IFM stripe 301c. The control processor circuitry determines the work batch filter 302, which in the present example is set to be the same as the initial filter (3h×3w), since the IFM stripe elements are all contiguous in the IFM. The control processor circuitry then determines the center point of the work batch filter 302 and counts the dimensional extent of elements to the top, left, right and bottom of it. These values can be used to determine nominal positional characteristic parameters. Nominal positional characteristic parameters are initially determined positional characteristic parameters which may be adjusted by considering a number of factors. When a dimension of the work batch filter 302 is even, the center point in that dimension may be found using Equation 1:

$$\text{Central Position} \approx \frac{\text{Dimension} - 1}{2} \qquad (1)$$

The calculated value may be rounded up or down to an adjacent integer value. One or more factors may be considered in making this decision. In the present example the configuration data indicate that a 'SAME' padding setting is used during the convolution and therefore, the top and left padding values are equal to the dimensional extent of elements above and to the left of the center point of the work batch filter 302 respectively. The nominal positional characteristic parameters are therefore, nominal top=1, nominal left=1, nominal right=1, nominal bottom=1 for the work batch filter dimensions of 3h×3w.

Figure 2C:
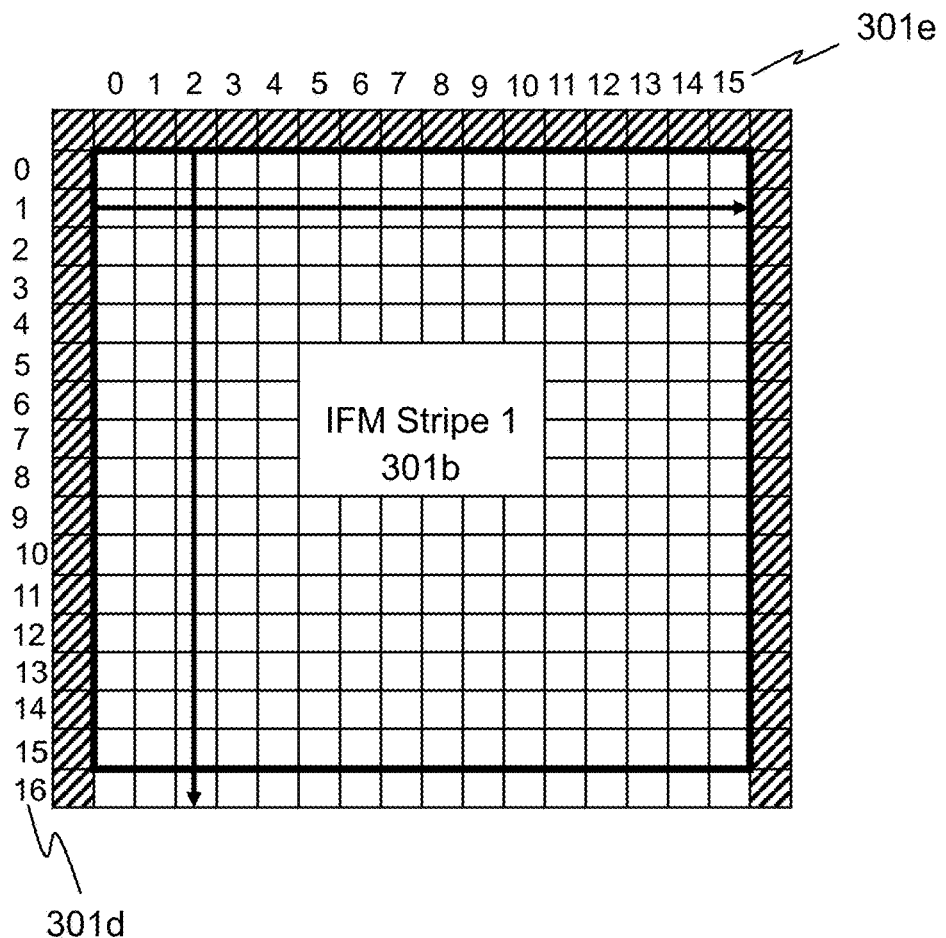
Figure 2C:
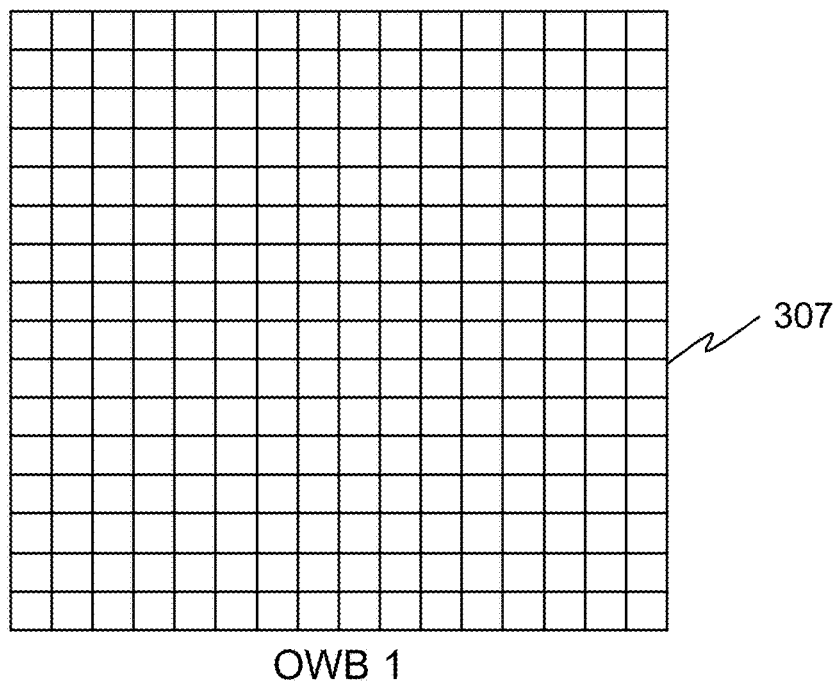

FIG. 2c illustrates the results of a method used by the software-hardware mechanism to determine positional characteristic parameters and dimensional characteristic parameters associated with the first input work batch in accordance with the first example of the present disclosure. The control processor circuitry analyses the IFM content in the first IFM stripe 301b and is also aware, due to its global view of the IFM, of the surrounding elements. The control processor circuitry may determine array position data associated with each element of the IFM. In the present example the array position data is made up of values representing the elements position in height 301d and width 301e. The control processor circuitry determines the dimensional characteristic parameters associated with the first input work batch which is 18h×18w as discussed previously. The delta values associated with the first input work batch are determined using the nominal delta values, the dimension of the first output work batch 307 and the first IFM stripe 301*b*. These parameters may be used to determine a nominal IFM content dimension as demonstrated by Equation 2:

$$\text{Nominal IFM Content Dimension} = \text{Output Work Batch Dimension} + \text{Nominal Delta Value} \quad (2)$$

In the present example, the dimensions of the first output work batch 307 are 16h×16w. The nominal delta values, nominal bottom=1 and nominal right=1 may be added to the height and width of the first output work batch respectively to give the dimensions 17h×17w. The nominal IFM content dimensions 17h×17w are then compared to the actual IFM content contained in the first IFM stripe 301*b* as well as the surrounding elements. Actual IFM content includes elements which are contained in the IFM and therefore does not include the padded values which have elements with zero values. As indicated by the array position data 301*e*, there is no actual IFM content beyond column 15 for the first IFM stripe 301*b* as beyond it are padded zero values. The nominal right delta value is therefore adjusted to be 0 for the actual delta value. However, in the case of the nominal bottom delta value, as indicated by the array position data 301*d*, at row 16 there is actual IFM content in the row below the first IFM stripe 301*b*. Therefore, the actual bottom delta value will remain unadjusted, the same as the nominal bottom delta value. Therefore, the bottom delta value=1. The left and top padding values remain the same as the nominal padding values and are not adjusted. Therefore, left padding value=1 and right padding value=1.

The control processor circuitry may also determine locational characteristic parameters, which indicate the location of the input work batch being determined in relation to the other input work batches. This indicates the relative locations of the feature map content. In the present example, the first input work batch is determined using the majority of the IFM content from the first IFM stripe 301*b* which is above the second IFM stripe 301*c*. The locational characteristic parameters may be represented using, for example, cartesian coordinates x,y=0,0.

Figure 2D:
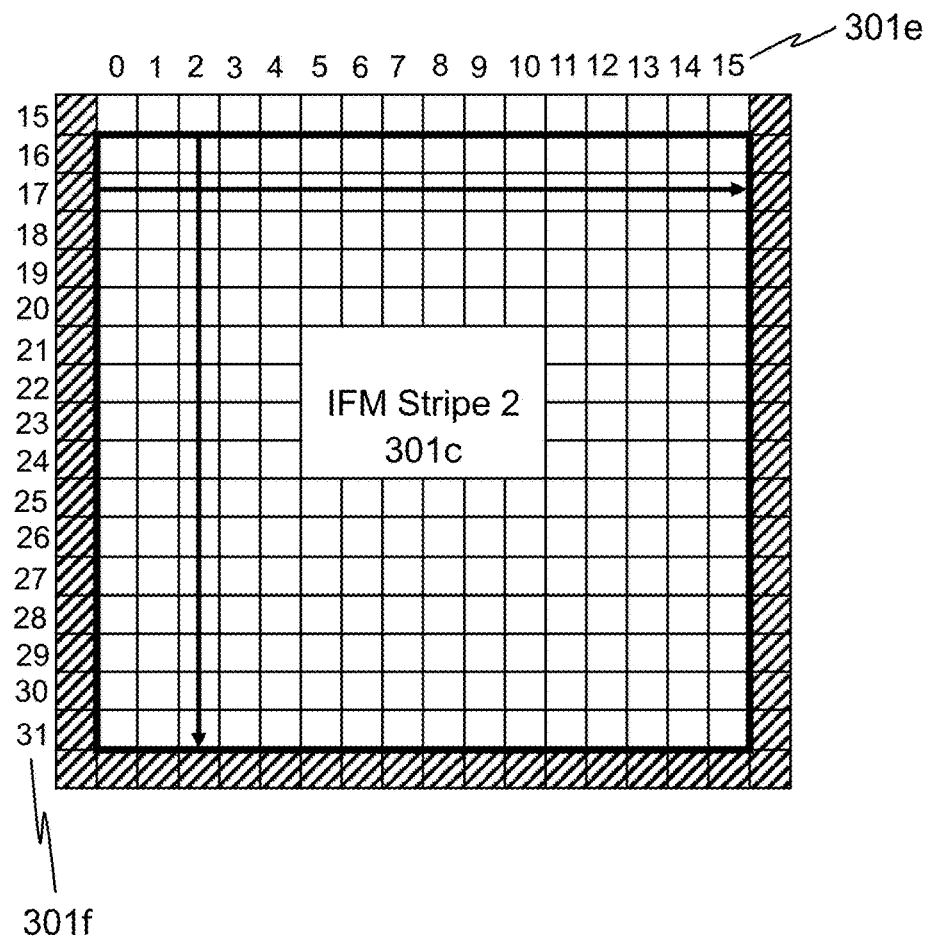
Figure 2D:
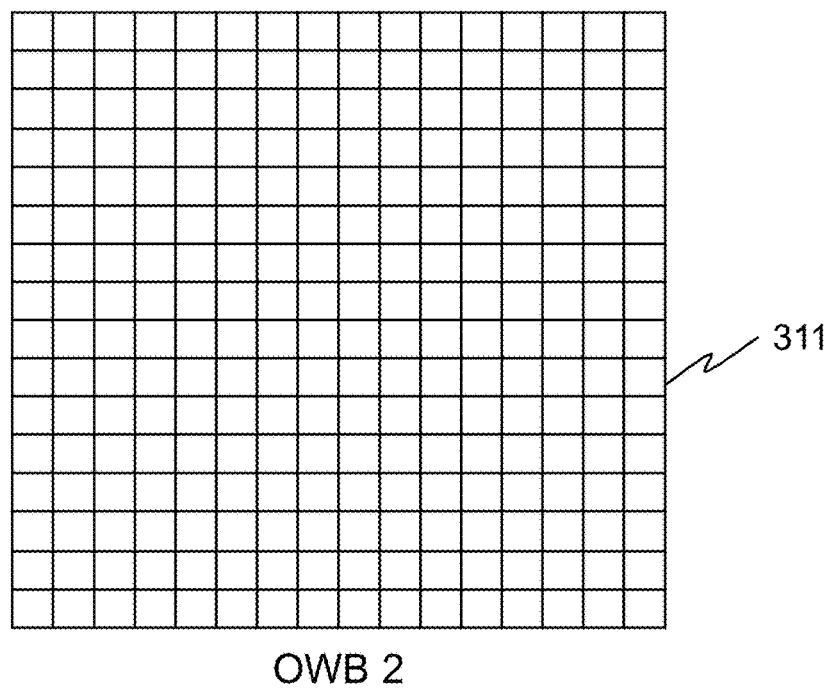

FIG. 2*d* illustrates the results of a method used by the software-hardware mechanism to determine positional characteristic parameters and dimensional characteristic parameters associated with the second input work batch in accordance with the first example of the present disclosure. The control processor circuitry considers the IFM analyses in the second IFM stripe 301*c* and once again, is aware of the surrounding elements due to its global view of the IFM. In the present example, the control processor circuitry determines array position data associated with the height 301*f* and width 301*e* of the elements position in the IFM. The control processor circuitry determines the dimensional characteristic parameters associated with the second input work batch which is 18h×18w as discussed previously. The delta values associated with the second input work batch may be determined using a method similar to that discussed previously using the nominal positional characteristic parameters, the dimensions of the second output work batch 311 and the second IFM stripe 301*c*. The dimensions of the second output work batch 311 are 16h×16w. The control processor circuitry takes into account that the second IFM stripe begins at row 16 using the array position data 301*f*. In the present example, there is no actual IFM content beyond column 15 and row 31 in the respective array position data. The right and bottom delta values associated with the second input work batch are therefore adjusted from the nominal positional characteristic parameters, to reflect this. Therefore, the right delta value=0 and the bottom delta value=0. The control processor circuitry determines the locational characteristic parameters from the second input work batch being constructed from the majority of elements contained in the second IFM stripe 301*c* which is found below the first IFM stripe 301*b*. In the present example locational characteristic parameters=(0,1). The left and top padding values remain the same as the nominal padding values and are not adjusted, as discussed previously. Therefore, left padding value=1 and top padding value=1.

Figure 2E:
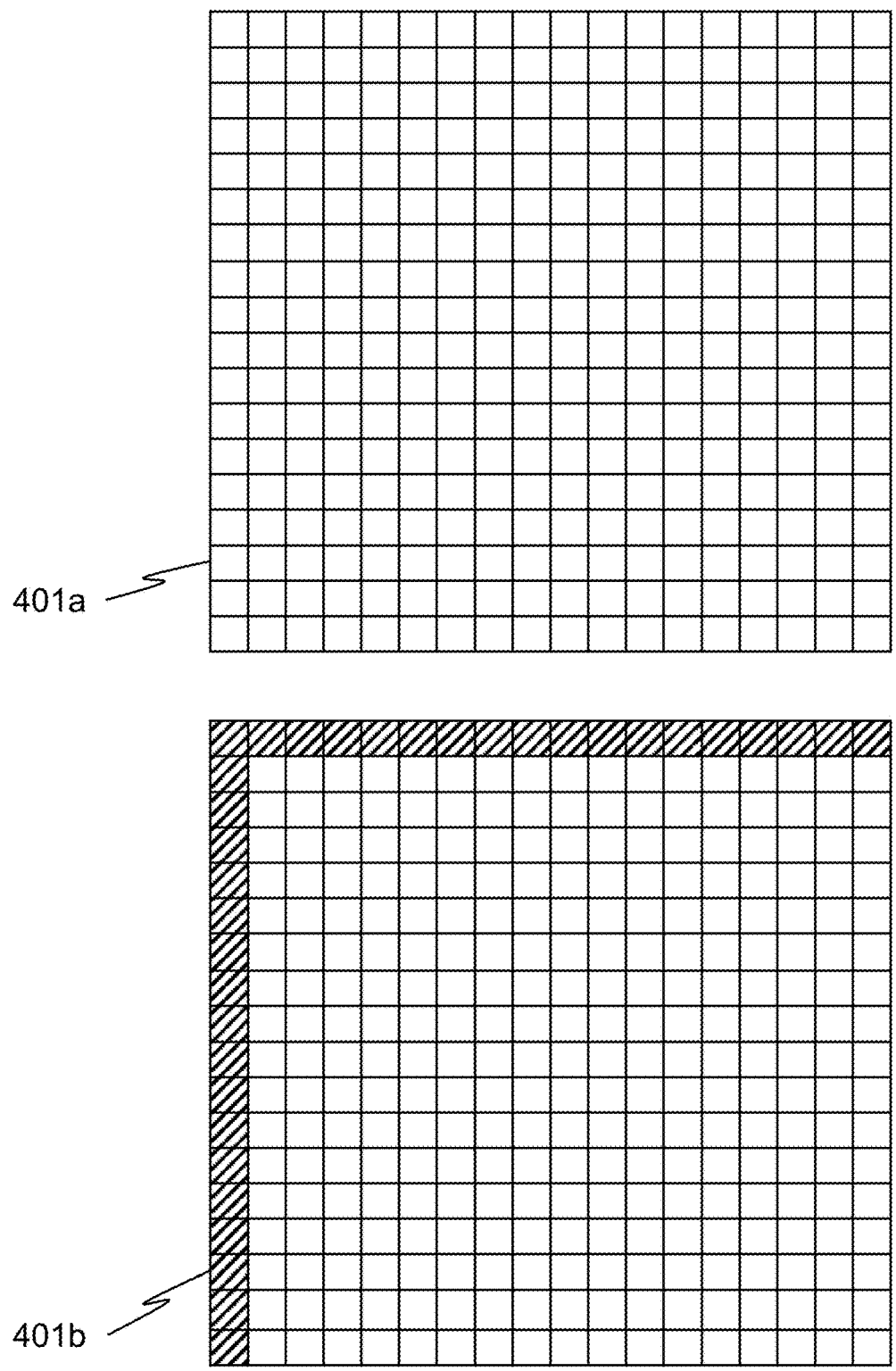

FIG. 2*e* illustrates the results of a method used by the software-hardware mechanism to generate the first input work batch from the associated dimensional characteristic parameters and padding values in accordance with the first example of the present disclosure. In one example, the input work batches are generated using the control processor circuitry and are then transferred to the arithmetic logic circuitry for convolution. In another example the input work batches are generated using the arithmetic logic circuitry for convolution. The dimensional characteristic parameters associated with the first input work batch are used to determine the dimensions of the first input work batch 401*a*, which in the present example has the dimensions 18h×18w. The input work batch may be generated in storage circuitry of the described system, with the dimensions of the input work batch being used to determine how much space in the storage circuitry should be prepared to be filled with data. Input work batch 401*a* illustrates the input work batch before it is filled with the IFM content or padded values and input work batch 701*b* illustrates the input work batch after it has been filled with initial padding values. The left and top padding values associated with the first input work batch are then used to fill the leftmost and topmost elements of the input work batch. In the present example, the left padding value=1 and the top padding value=1. It should be noted that in the present example, there are also locational characteristic parameters and array position data associated with the first input work batch which are used with the top and left padding values to determine if actual IFM content should be used as the leftmost or topmost padding values of the input work batch. For the first input work batch, as indicated by the first IFM stripe 301*b*, padding values are implemented for both the leftmost and topmost elements, so the topmost row and leftmost column are padded with zero values. In one example, the zero values contained in the input work batch are generated by either the arithmetic logic circuitry or control processor circuitry. In another example, the input work batch is initialized with zero values with the left and bottom padding values indicating that these element values should not be changed. The steps of the method discussed so far generate the input work batch 401*b*.

Figure 2F:
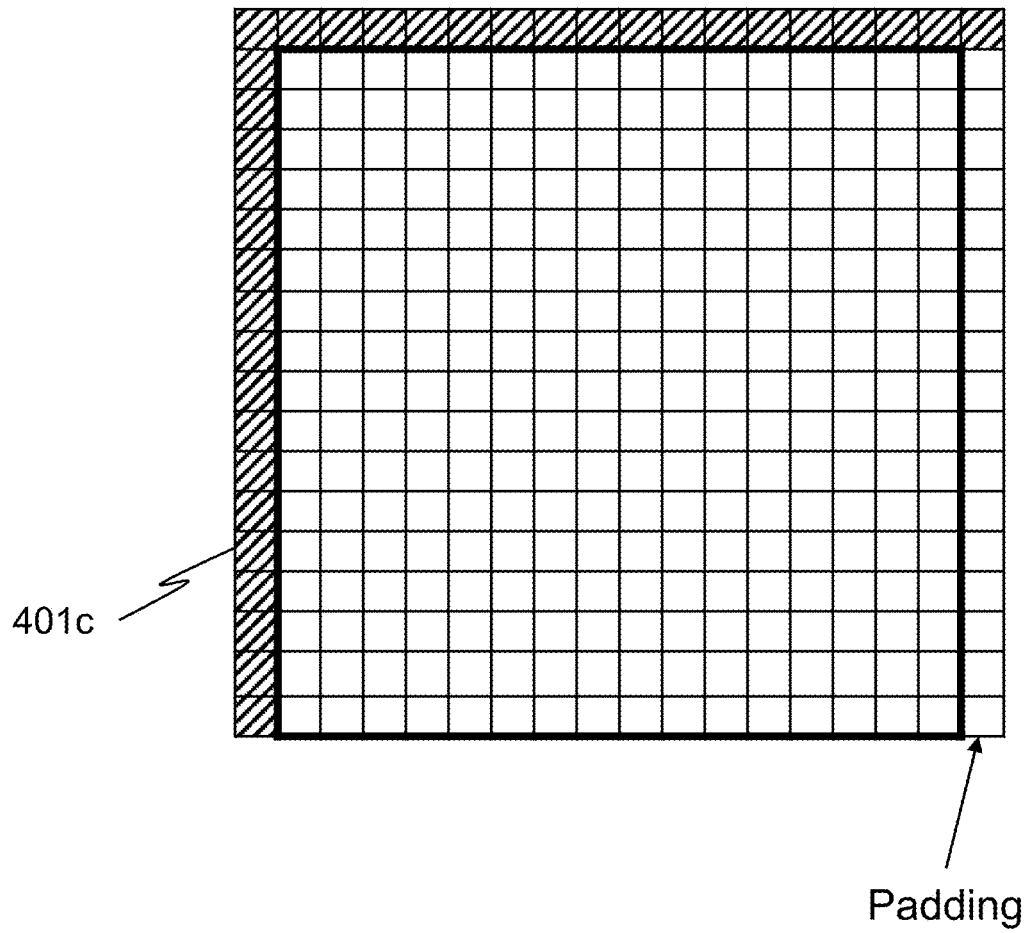

FIG. 2*f* illustrates the results of a method used by the software-hardware mechanism to generate the first input work batch from the delta values in accordance with the first example of the present disclosure. The right and bottom delta values are used to determine the amount of IFM content used by the input work batch to generate the output work batch. In one example this is determined by the control processor circuitry. In another example this is determined by the arithmetic logic circuitry. The dimension of the IFM content to be loaded can be calculated using Equation 3:

$$\text{IFM Content} = \text{Output Work Batch Dimension} + \text{Delta Value} \quad (3)$$

Figure 2G:
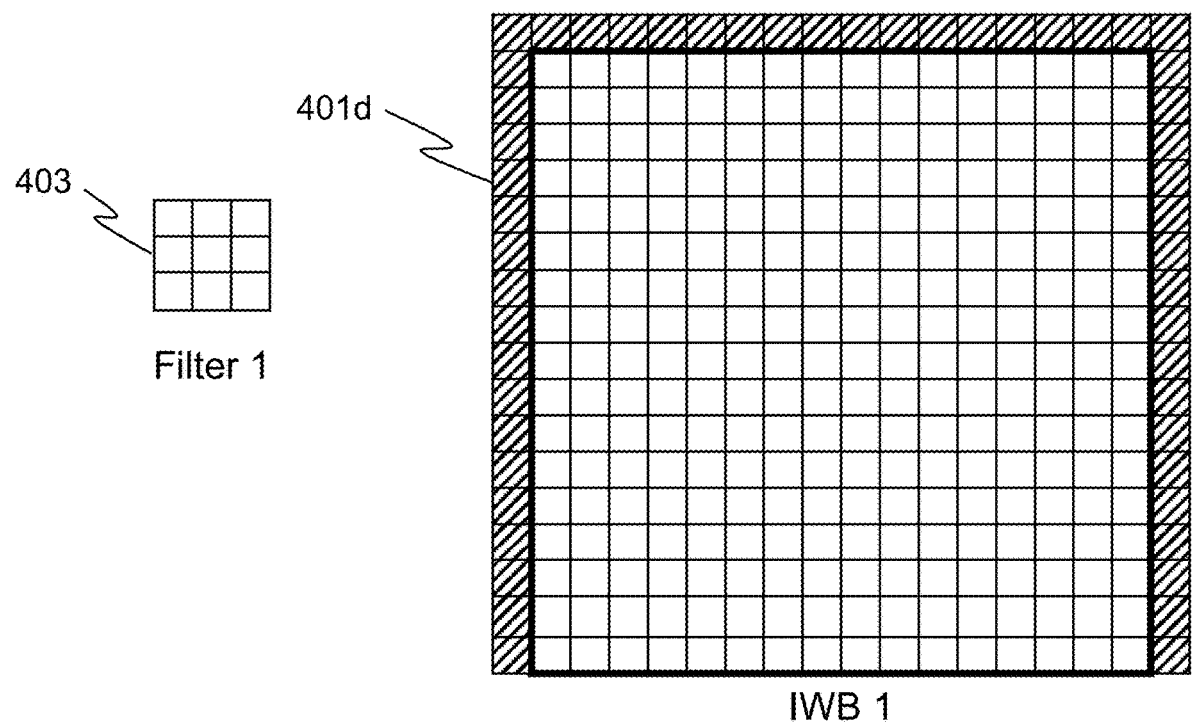
Figure 2G:
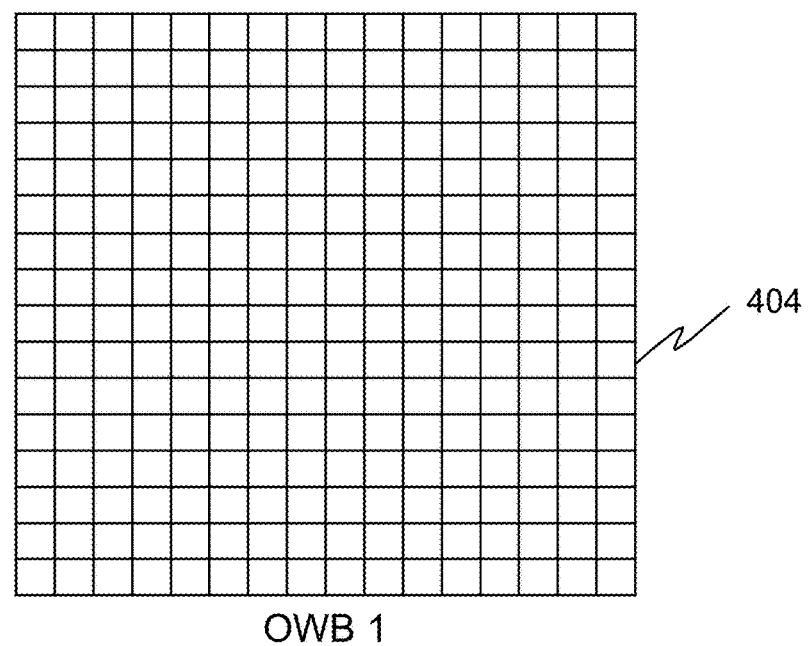

The width of IFM content can be calculated by adding the output work batch width to the right delta value and the height of the IFM content can be calculated by adding the output work batch height to the bottom delta value. In the present example the IFM content used by the first input work batch is determined to have the dimensions 17h×16w. These dimensions may be used alongside array position data to determine the elements of the IFM to be loaded into the input work batch. The first input work batch 401c is filled with the IFM content starting from the top leftmost undetermined element. In one example, there are undetermined elements remaining after the input work batch is filled with IFM content and these are filled by padding with zero values. In another example, the undetermined elements already have zero values if the input work batch was initialized with zero values when it was first generated. Input work batch 401c illustrates the input work batch after it has been filled with IFM content. FIG. 2g illustrates the generated first input work batch 401d and corresponding work batch filter 403 for convolution in accordance with the first example of the present disclosure. The work batch filter 403 to be convolved with the first input work batch 401d is identical to the filter in the present example, as discussed previously. The arithmetic logic circuitry convolves the generated first input work batch 401d with the corresponding work batch filter 403 to produce the first output work batch 404.

Figure 2H:
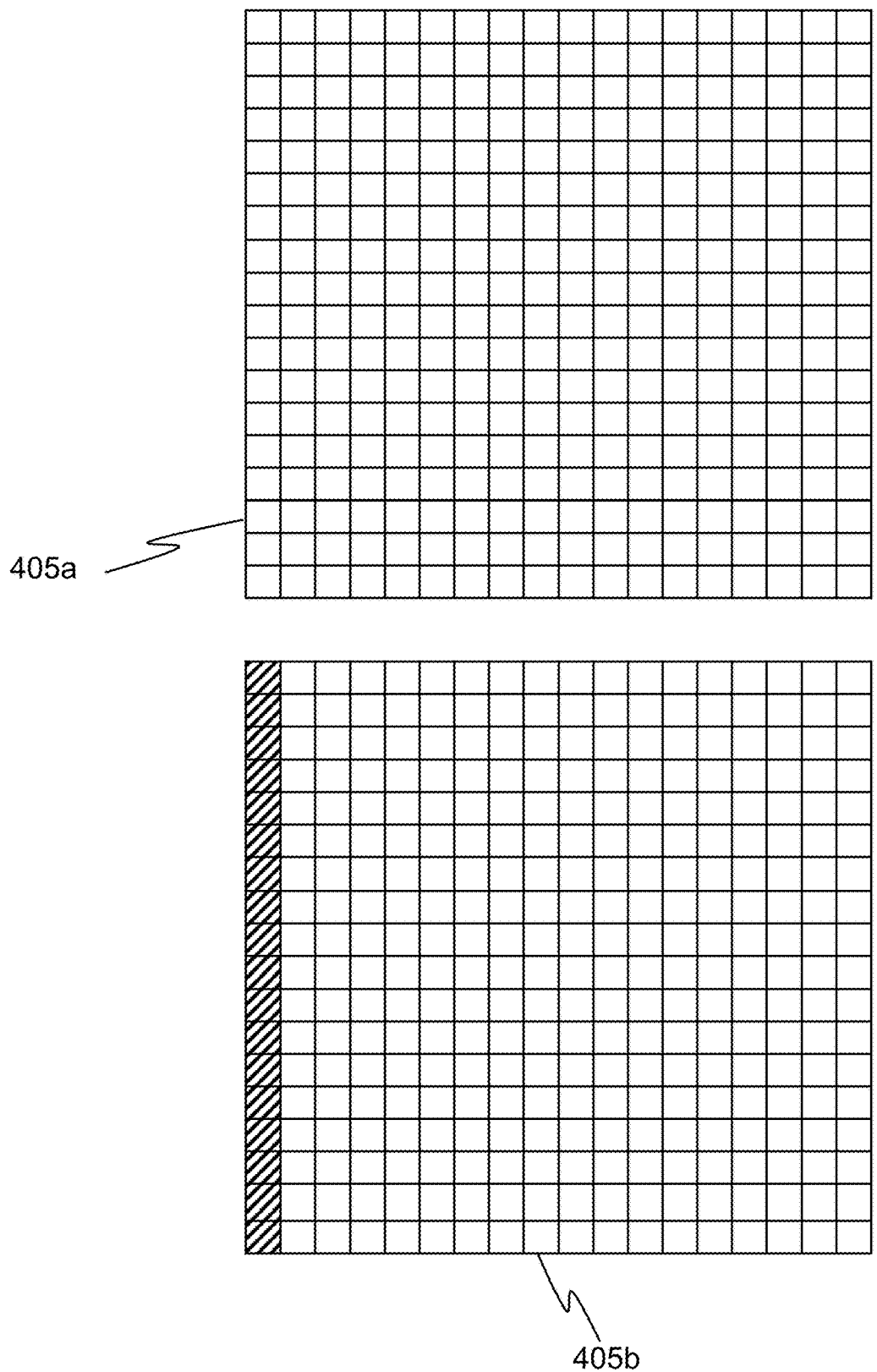
Figure 2I:
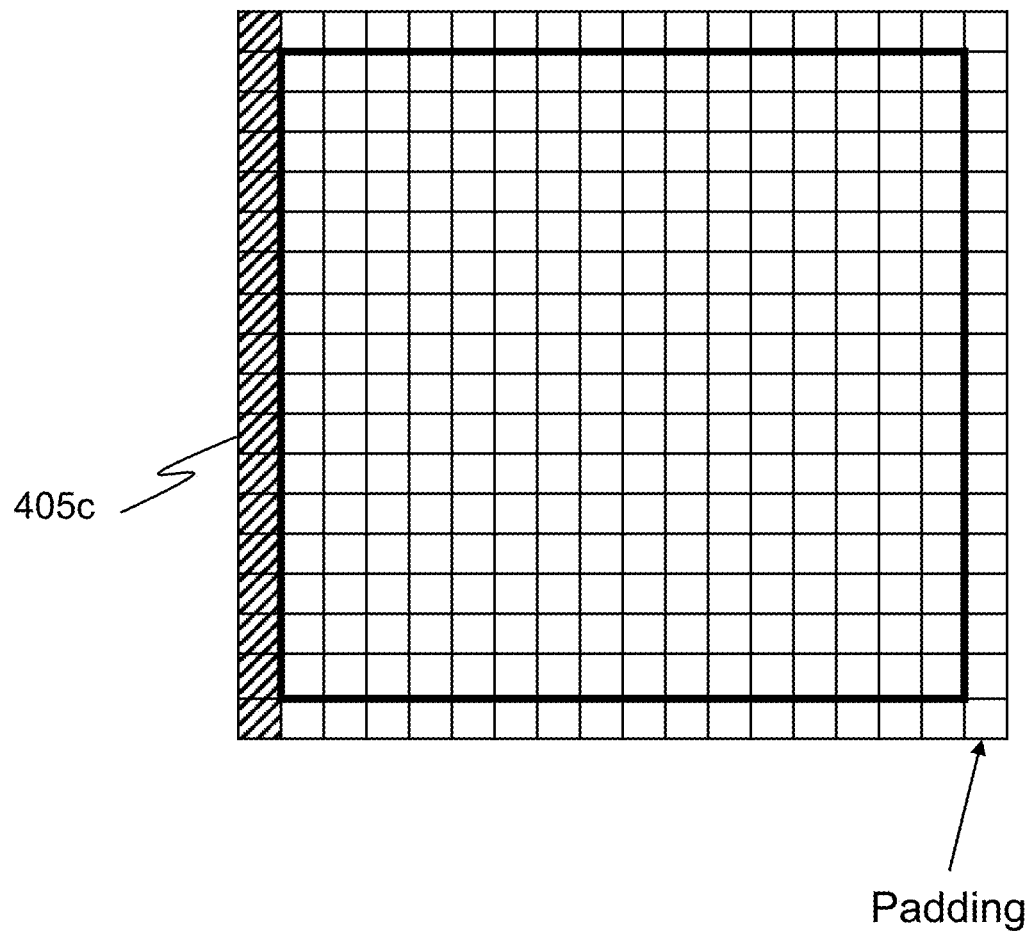

FIG. 2h illustrates a second input work batch generated using the associated dimensional characteristic parameters and positional characteristic parameters in accordance with the first example of the present disclosure. This is achieved using the same method discussed for generating the first input work batch. Input work batch 405a illustrates the input work batch before it is filled with the IFM content or padded values and input work batch 405b illustrates the input work batch after it has been filled with initial padding values. The second input work batch 405a with dimensions 18h×18w is generated using the associated dimensional characteristic parameter. The top and left padding values are used to fill the leftmost and topmost elements of the second input work batch. It may be determined using the associated array position data and locational characteristic parameters, that the topmost padded elements should have actual IFM content as demonstrated by the second IFM stripe 301c and the leftmost padded elements should have zero values. These method steps generate the input work batch 405b. FIG. 2i illustrates the second input work batch generated using the associated right and bottom delta values in accordance with the first example of the present disclosure. Once again, this method corresponds with the method used to generate the first input work batch. Input work batch 401c illustrates the input work batch after it has been filled with IFM content. The amount of IFM content is determined using the right and bottom delta values and the output work batch dimensions with Equation 3. In the present example, the dimensions of the IFM content for the second input work batch are 16h×16w. These dimensions along with the array position data are used to determine which elements of the second IFM stripe 301c to import into the second input work batch. The second input work batch 405c is filled with the IFM content from the top leftmost undetermined element. The undetermined elements after filling the second input work batch with IFM content are then determined to have zero values.

Figure 2J:
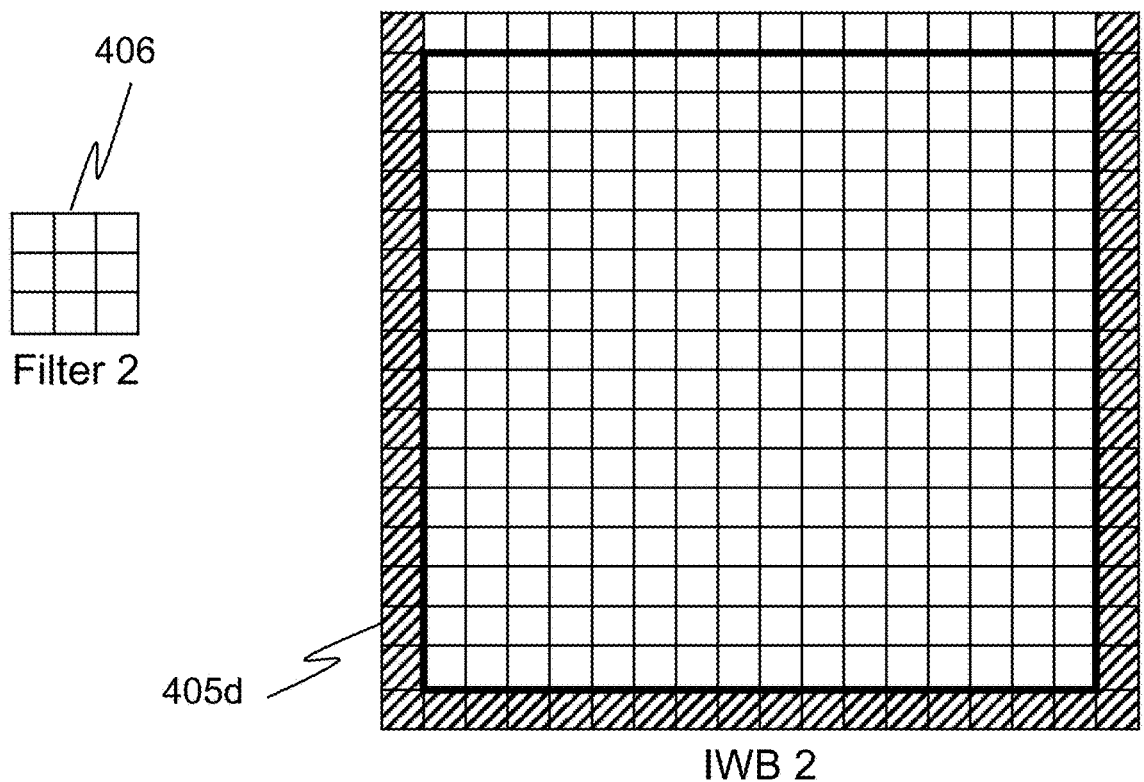
Figure 2J:
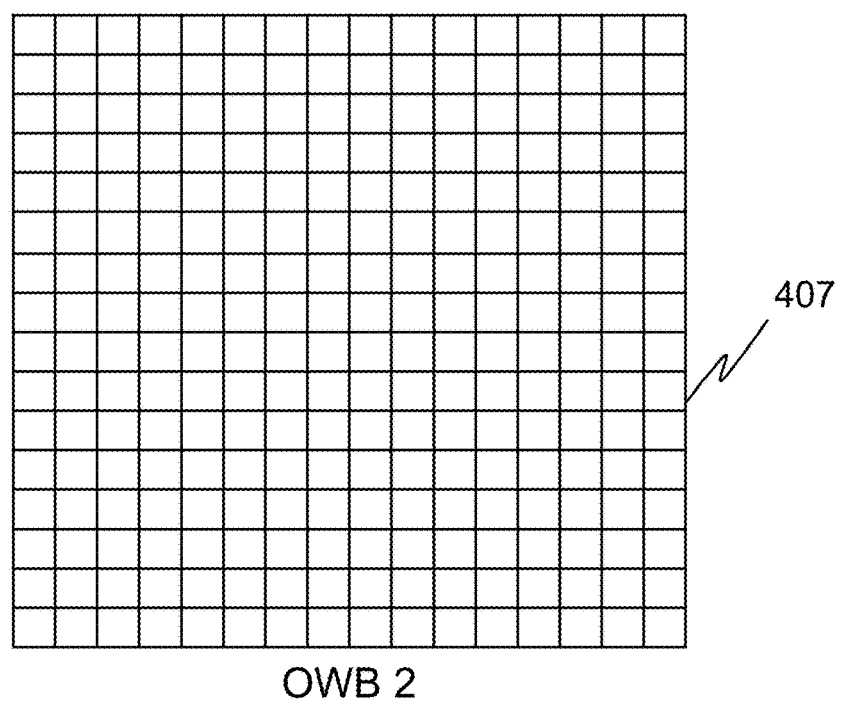
Figure 2K:
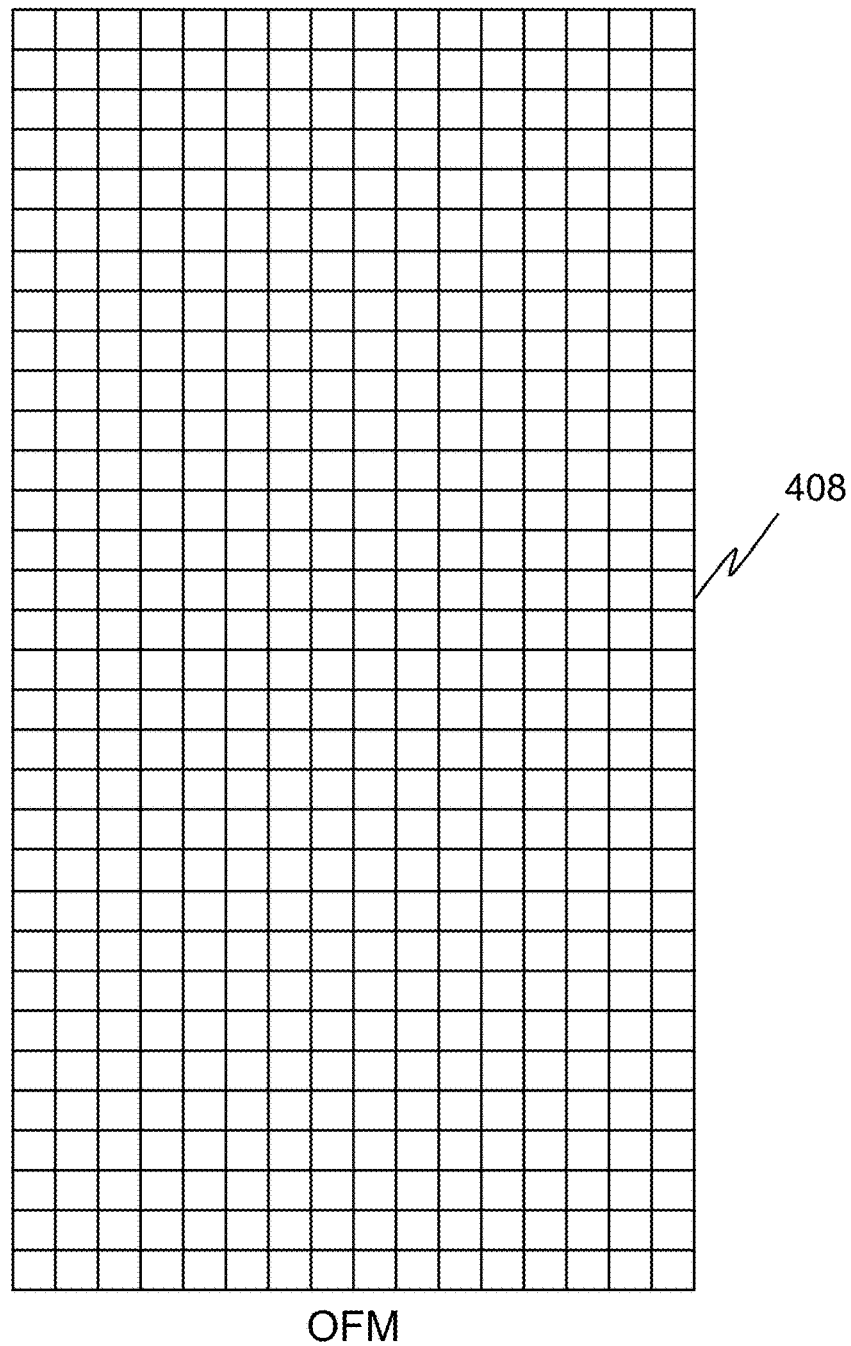

FIG. 2j illustrates a generated second input work batch 405d and corresponding work batch filter 406 for convolution. The work batch filter 406 to be convolved with the second input work batch 405d is identical to the filter in the present example, as discussed previously. The arithmetic logic circuitry performs the convolution between the second input work batch 405d and work batch filter 406 to determine the second output work batch 407. FIG. 2k illustrates the results of the method used by the software-hardware mechanism to determine the OFM 408 by combining the first output work batch 404 and second output work batch 407 in accordance with a first example of the present disclosure. The arithmetic logic circuitry uses the first output work batch 404 and second output work batch 407 along with their associated locational characteristic parameters to determine the OFM 408. In the present example, the associated locational characteristic parameters indicate that the first output work batch 404 be placed above the second output work batch 407 to determine the OFM 408. Once determined, the OFM 408 may then be passed to the next convolution layer as the IFM for further processing.

The first example of the present disclosure provides a number of advantages. The software has a global view of the IFM content, even though the hardware may be aware of only the section it is currently working on. The software controls the fetching of IFM content from the storage circuitry in which it is stored, to ensure it lies within the coordinate space of the relevant feature map. The method is flexible in that it extends to convolutional operational modes which may simultaneously have a number of different convolution types. It prevents the need for an NPU with hardware logic of a high complexity, saving space on the chipset and reducing the overall power consumption of the described system. The software also allows for the determination of the number of memory accesses which are to be performed in order to fetch data from the storage circuitry to be placed in the data buffer in order to perform operations. This information can be used to determine the appropriate dimensions for work batches in order to optimize the number of memory accesses to reduce the power consumption of the neural processing system.

The determination of the locational characteristic parameters aids in the process of splitting up the convolution into more efficiently calculable parts. The locational characteristic parameters can be used to combine the output work batches in the correct manner to form the OFM. The determination of array position data allows for an awareness of the position of each element within the IFM to help with loading the IFM content into the input work batches. The determination of positional characteristic parameters from the work batch filters provides a method which has the flexibility to work with a number of convolutional operation modes. The use of padding values makes the hardware software mechanism compatible with different numbers of padding elements for convolution. The contiguous loading of IFM content into the input work batch allows for the grouping of data as it is being sent between components of the described system as well as providing a way of performing sections of the convolution in an effort to improve the efficiency of the described system. Determining the configuration data from the target dimensions of the OFM allows the software-hardware mechanism to operate with only the OFM target dimensions, IFM and filter. The described system is able to determine the convolutional operation mode without further input. The described system is also able to determine the OFM target dimensions if the CNN has already determined the convolutional operation mode to process the IFM with the filter. Generating the input work batch using the control processor circuitry further reduces the hardware components in the arithmetic logic circuitry which would be used for this purpose. Generating the input work batch using the arithmetic logic circuitry allows for the use of specialized hardware which could improve the speed of generating the input work batch.

FIGS. 3a-3i are used to illustrate the inputs and results of a method used by the software-hardware mechanism for performing a convolution between a convolutional filter and an IFM in accordance with a second example of the present disclosure. In the present example, the configuration data indicate a convolution using 'VALID' padding. 'VALID' padding indicates that no extra rows or columns of values are required by the IFM during convolution. The method shares a number of similarities with the method discussed in the first example of the present disclosure.

Figure 3A:
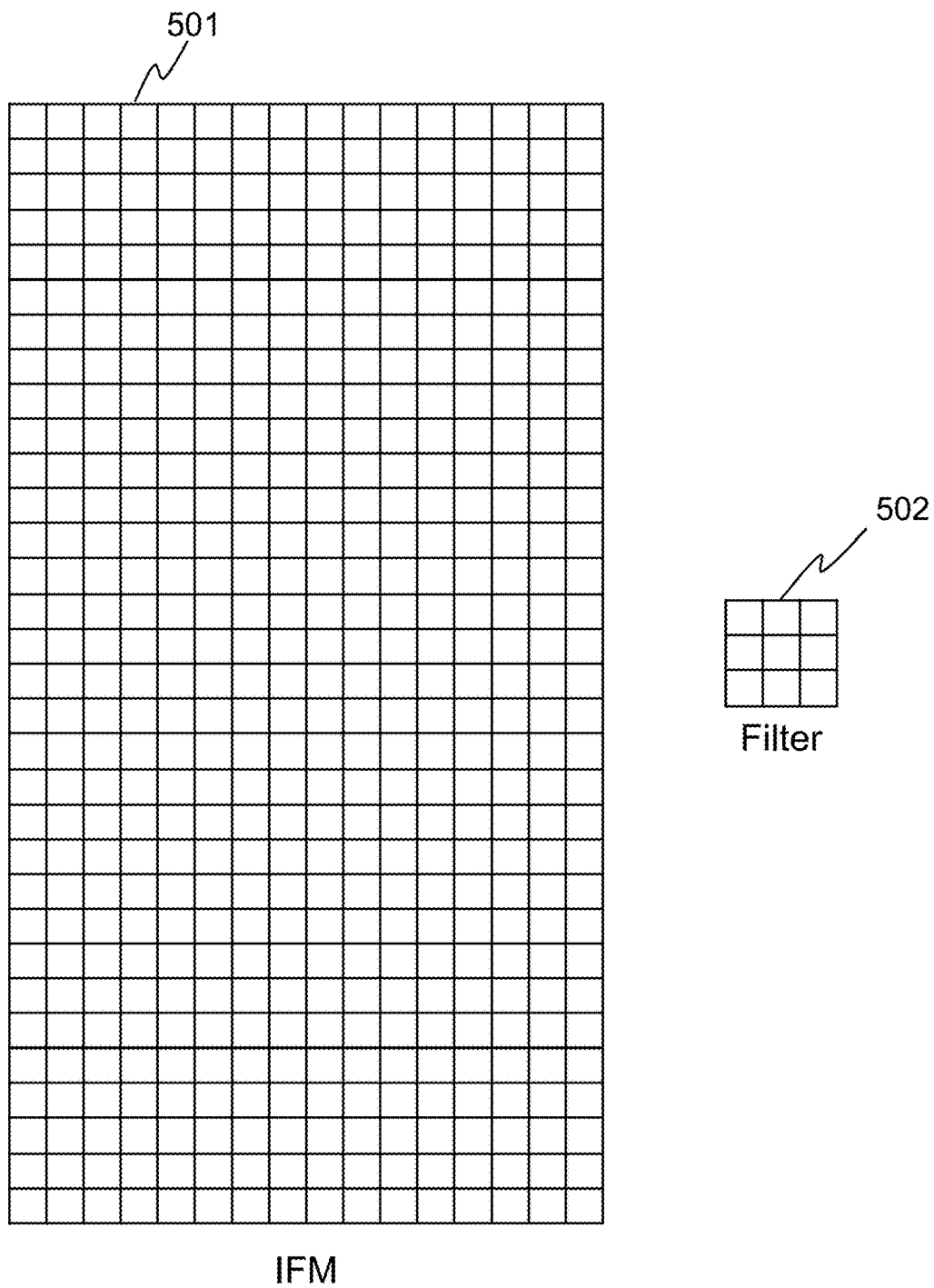
FIGS. 3a to 3i illustrate features of a method used by a software-hardware mechanism in accordance with a second example of the present disclosure.

FIG. 3a illustrates an IFM 501 and filter 502 for a convolution layer of a CNN in accordance with the second example of the present disclosure. The IFM 501 has dimensions 32h×16w, while the filter 502 has the dimensions 3h×3w. The target dimensions of the OFM are 30h×14w. The configuration data may be determined using the target OFM dimensions by the control processor circuitry. The configuration data in the present example contains identifiers which demonstrate that for the convolution layer, a 'VALID' padding setting is used, the filter strides the IFM during convolution one element at a time and the IFM is not upsampled. The control processor circuitry may use the target OFM dimensions and memory capacity of the described system and number of memory accesses to determine the number and dimensions of output work batch. In the present example, the control processor circuitry has determined to use two output work batches with dimensions 16h×14w and 14h×14w. The control processor circuitry may determine the dimensions of the output work batches by ensuring that both the horizontal and vertical dimensions have an even value based on the IFM content and work batch filter dimensions.

Figure 3B:
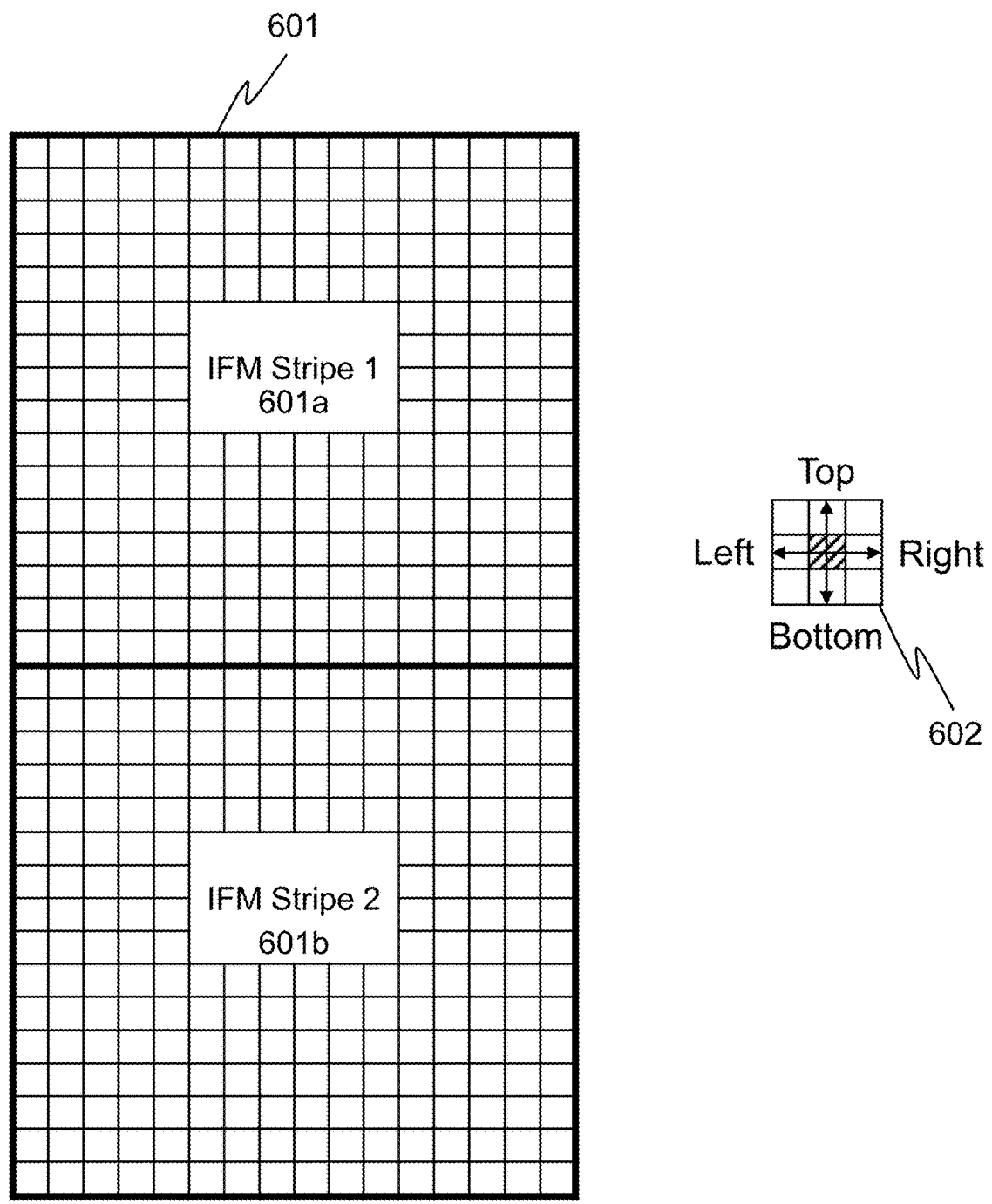

FIG. 3b illustrates the results of a method used by the software-hardware mechanism to determine the dimensional characteristic parameters and nominal positional characteristic parameters in accordance with the second example of the present disclosure. The steps of this method share a number of similarities with those discussed in the first example. The IFM 601 illustrates the control processor circuitry's global view of the IFM. The configuration data indicate that the convolution uses a 'VALID' padding setting, and the control processor circuitry uses this information to determine no extra elements are used for this convolution. The control processor circuitry previously determined that the OFM can be constructed by generating two output work batches, therefore the control processor circuitry may split the IFM 601 into two equal stripes with dimensions 16h×16w, the first IFM stripe 601a and the second IFM stripe 601b. It should be noted that the IFM stripes may have equal dimensions, even if the output work batch are not of equal dimensions. The control processor circuitry also determines that the work batch filter 602 will be identical to the filter 502 (3h×3w) as the IFM stripes have elements which are all contiguous in the IFM. The control processor circuitry then determines the nominal positional characteristic parameters by counting the dimensional extent of elements to the left, top, right and bottom of the center of the work batch filter 602. As 'VALID' padding is used for convolution, the top and left padding values both have a value of 0. The 'VALID' padding setting also informs the calculation of nominal right and bottom delta values. The nominal right delta value is calculated by adding the dimensional extent of elements to the left and right of the center point of the work batch filter 602 together and the nominal left delta value is calculated by adding the dimensional extent of elements to the top and bottom of the center point of the work batch filter 602 together. Therefore, the nominal delta values nominal right and nominal bottom will both have a value of 2. It should be noted that the determination of the nominal positional characteristic parameters is different for the different types of padding.

Figure 3C:
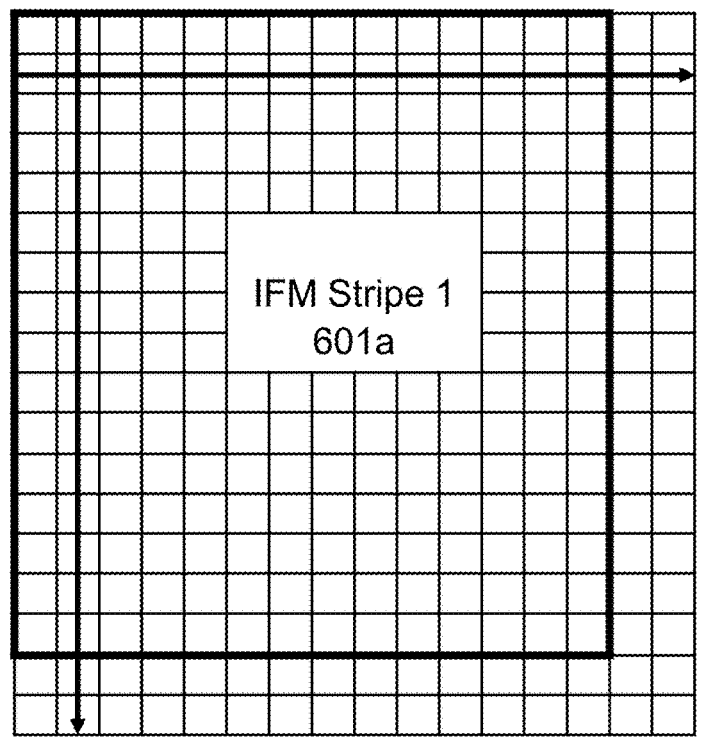
Figure 3C:
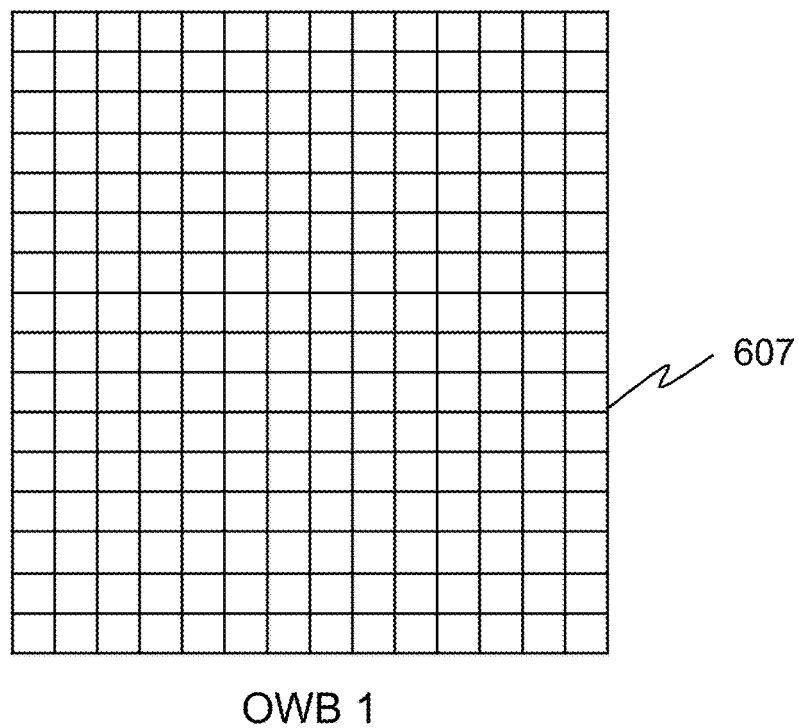

FIG. 3c illustrates the results of a method used by the software-hardware mechanism to determine the positional characteristic parameters and dimensional characteristic parameters associated with the first input work batch in accordance with the second example of the present disclosure. The control processor circuitry analyses the IFM content of the first IFM stripe 601a and is also aware of the surrounding elements. The control processor circuitry may determine array position data associated with each element of the IFM as demonstrated in the first example of the present disclosure. The control processor circuitry determines the dimensional characteristic parameters associated with the first input work batch by considering the dimensions of the input work batch which would be used to generate the dimensions of the first output work batch 607 16h×14w when convolved with the work batch filter 602. In the present example, the dimensions of the first input work batch are 18h×16w. The delta values associated with the first input work batch can be determined considering the nominal delta values and the dimensions of the output work batch 607 using a method similar to that discussed in the first example of the present disclosure. The nominal IFM content dimensions can be calculated using Equation 2. In the present example, there is actual IFM content matching the calculated nominal IFM content dimensions 18h×16w. The actual IFM content is contained within the first IFM stripe 601a to the right and beyond the first IFM stripe 601a to the bottom. This means that the right and bottom delta values remain at a value of 2, matching the nominal right and bottom delta values. Locational characteristic parameters associated with the first input work batch may also be determined by the control processor circuitry using a method similar to that discussed in the first example of the present disclosure. The locational characteristic parameters in the present example are 0,0. It should be noted that the left and top padding values once again remain unadjusted and are therefore the same as the nominal left and top padding values. Therefore, left padding value=0 and top padding value=0.

Figure 3D:
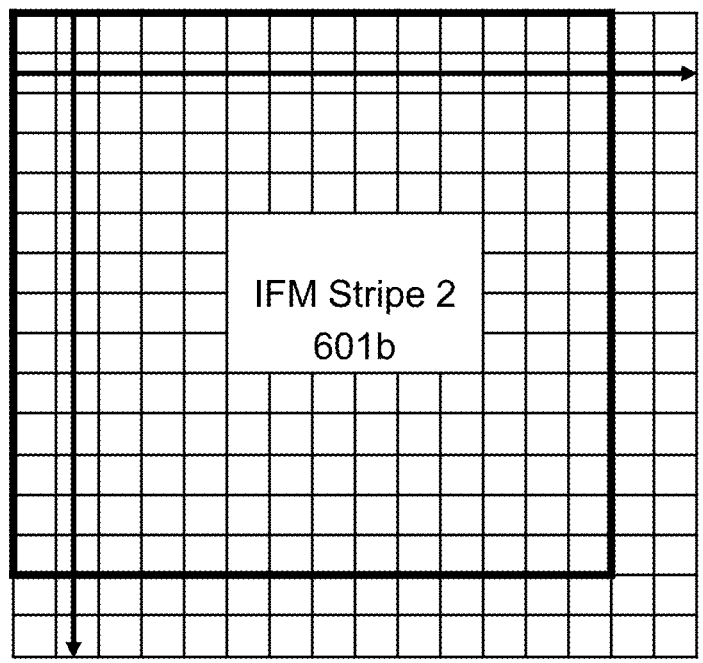
Figure 3D:
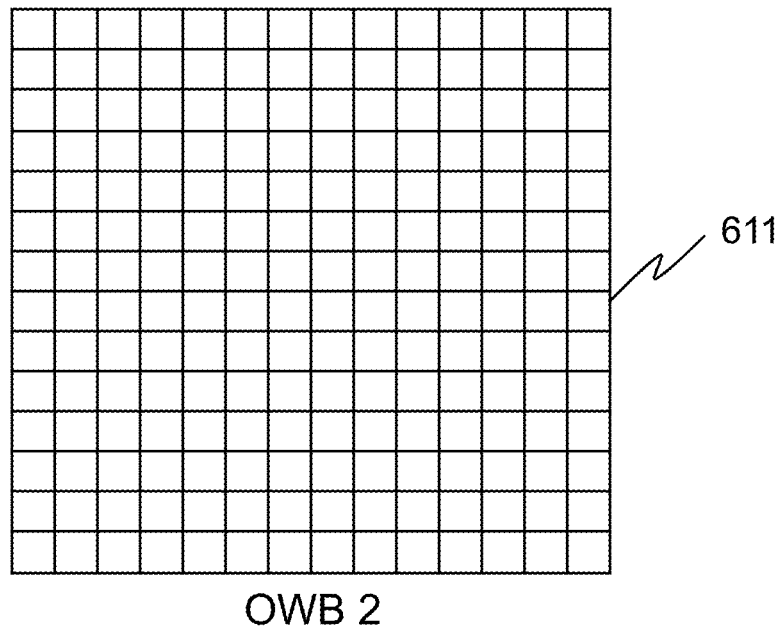

FIG. 3d illustrates the results of a method used by the software-hardware mechanism to determine the positional characteristic parameters and dimensional characteristic parameters associated with a second input work batch in accordance with the second example of the present disclosure. The method is similar to that previously discussed in the case of the control processor circuitry determining the positional characteristic parameters and dimensional characteristic parameters associated with the first input work batch in the present example. The control processor circuitry determines the dimension of the second input work batch as 16h×16w. The right and bottom delta values are determined using the dimension of the second output work batch 611 14h×14w and nominal delta values with Equation 2. In the present example, the right delta value=2 and the bottom delta value=2. The locational characteristic parameters associated with the second input work batch may also be determined by the control processor circuitry using a method similar to that discussed in previous examples. In the present example, locational characteristic parameters=(0,1). The left and top padding values once again remain unadjusted and are therefore the same as the nominal left and top padding values. Therefore, padding value left=0 and padding value top=0.

Figure 3E:
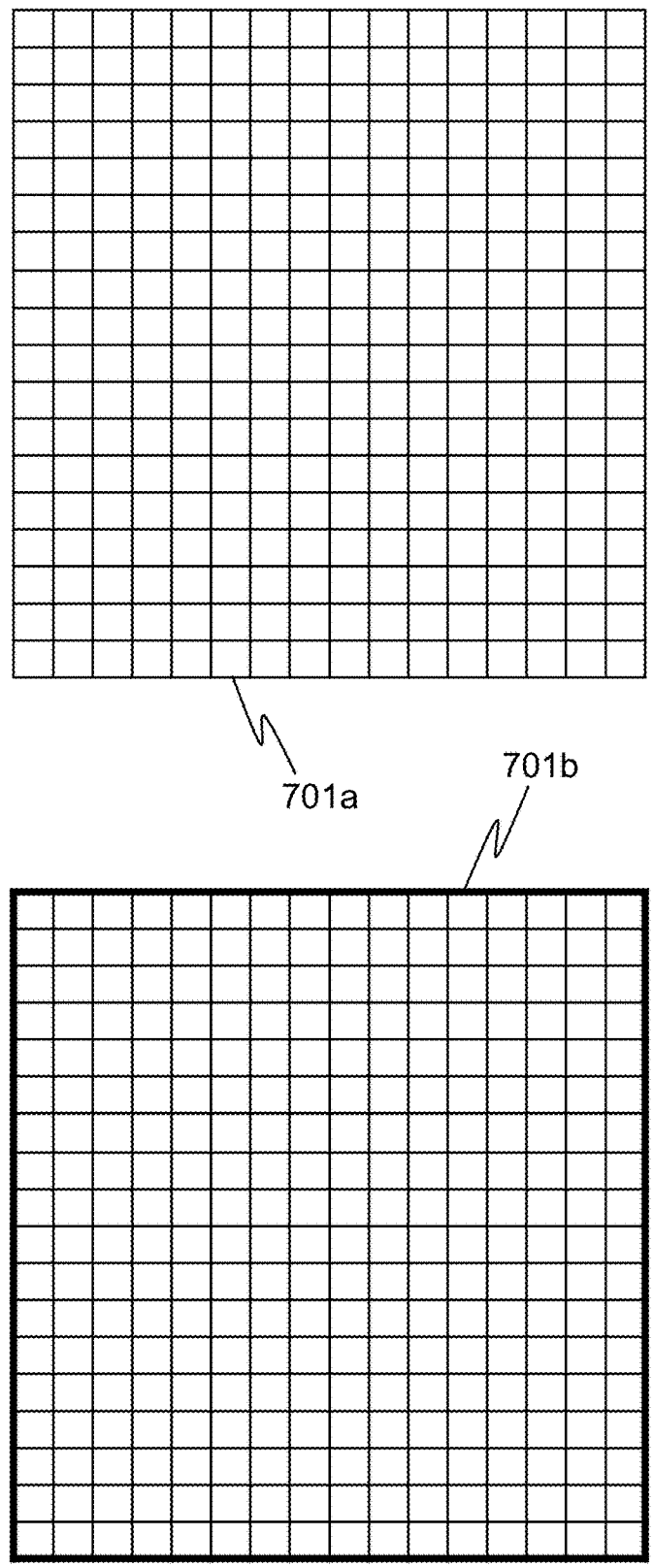
Figure 3F:
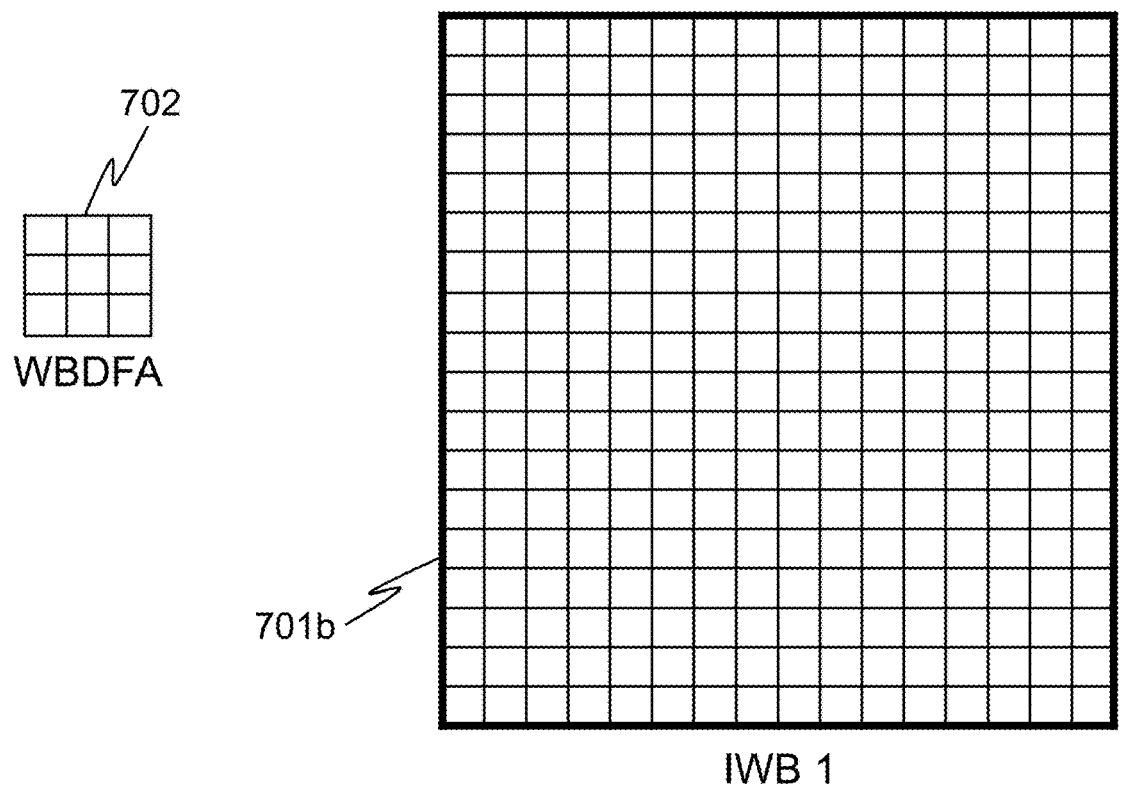
Figure 3F:
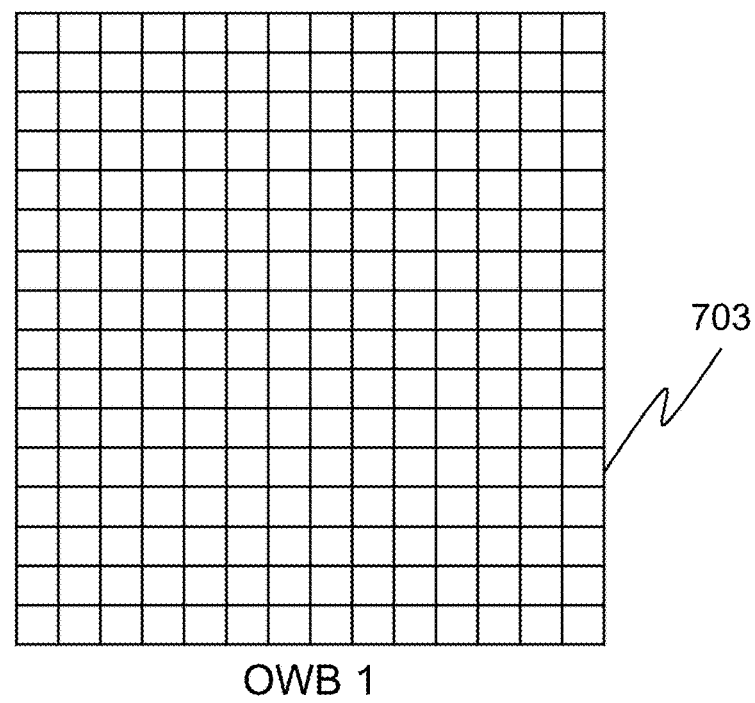

FIG. 3e illustrates the results of a method used by the software-hardware mechanism to generate the first input work batch from the associated dimensional characteristic parameters and positional characteristic parameters in accordance with the second example of the present disclosure. This method shares a number of similarities with the method discussed in the first example of the present disclosure. The dimensional characteristic parameters associated with the first input work batch are used to generate an input work batch 701a of appropriate dimensions 18h×16w. In one example, the input work batch is initialized with zero values upon generation. The left and top padding values have a value of zero, indicating that the IFM content will immediately fill the top leftmost elements of the first input work batch and no padding values are used. The dimension of the IFM content 18h×16w is calculated using the method demonstrated in the first example of the present disclosure. These dimensions may be used alongside associated array position data to determine the elements of the IFM to be loaded into the first input work batch. Input work batch 701a illustrates the input work batch before it is filled with the IFM content and input work batch 701b illustrates the input work batch after it has been filled. In the present example the IFM content fills the entire input work batch 701b, therefore there are no undetermined elements. FIG. 3f illustrates the generated first input work batch 701b and corresponding work batch filter 702 for convolution in accordance with the second example of the present disclosure. The work batch filter 702 to be convolved with the first input work batch 701b is identical to the filter with the dimensions 3h×3w in the present example, as discussed previously. The arithmetic logic circuitry convolves the generated first input work batch 701b with the corresponding work batch filter 702 to produce the first output work batch 703.

Figure 3G:
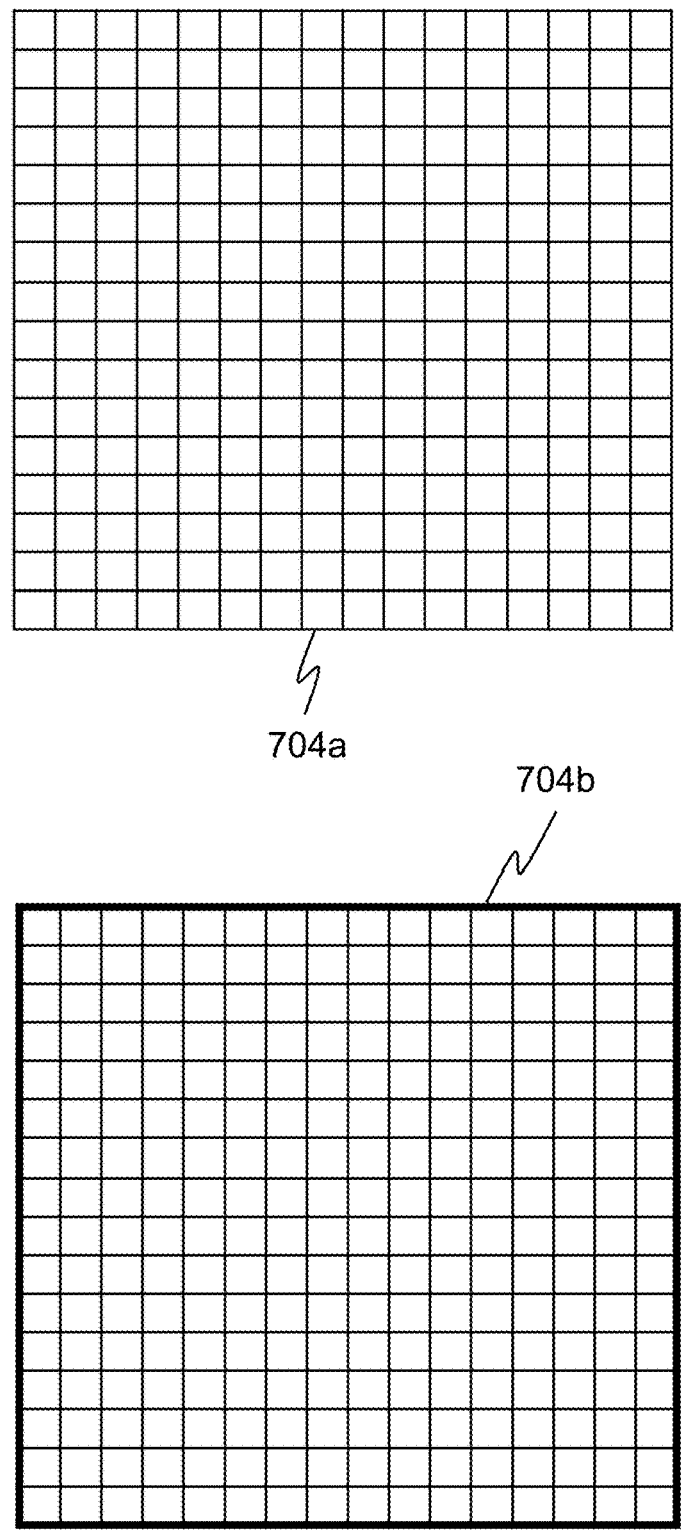
Figure 3H:
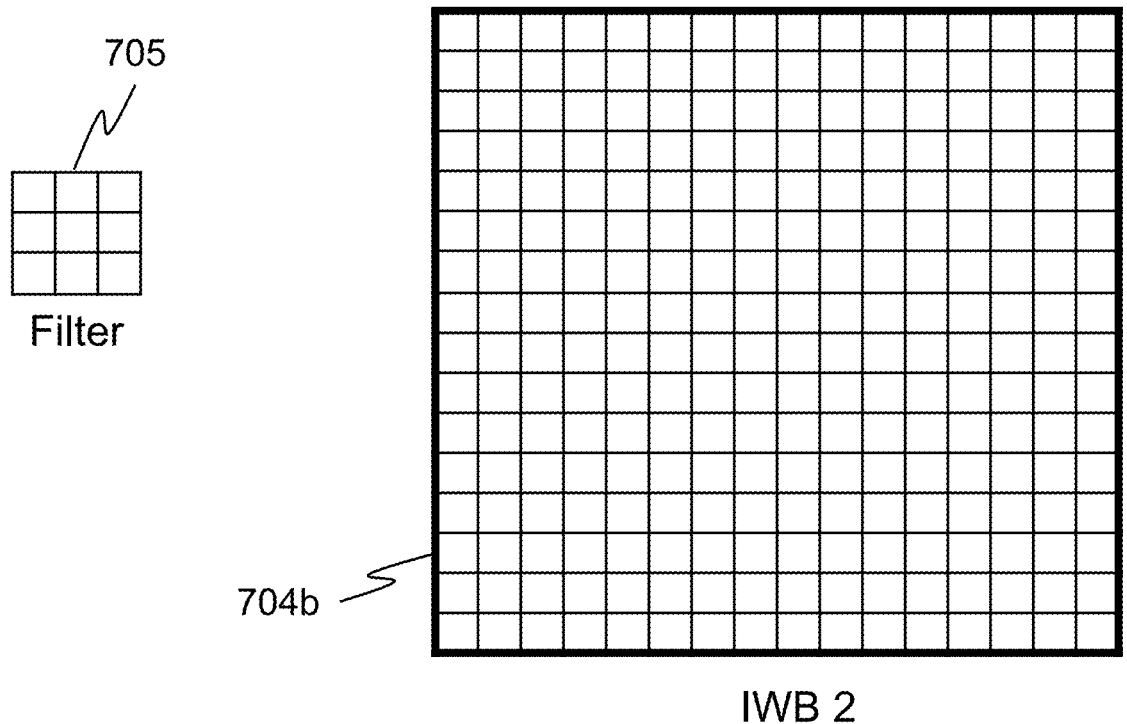
Figure 3H:
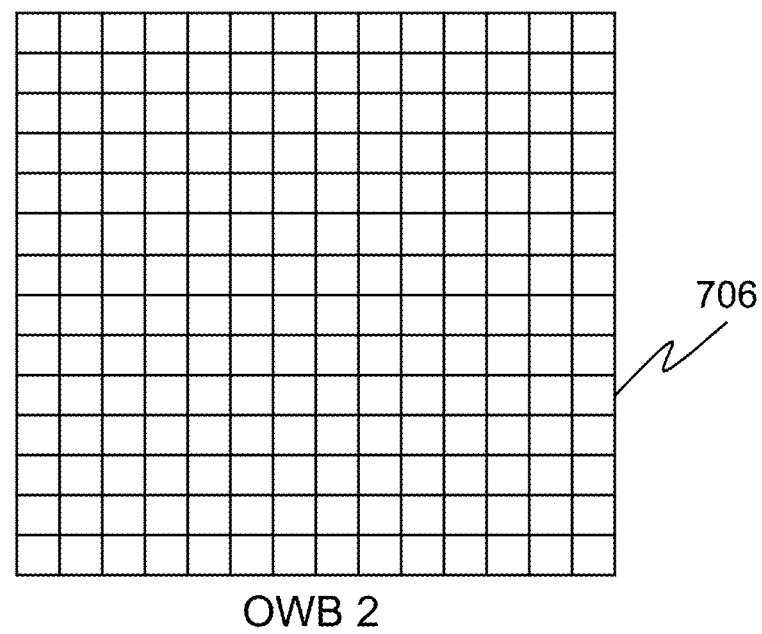

FIG. 3g illustrates a second input work batch generated using the associated dimensional characteristic parameters and positional characteristic parameters in accordance with the second example of the present disclosure. As with the generation of the first input work batch discussed in the present example, the left and top padding values indicate the IFM content should immediately fill the second input work batch 704a with dimensions 16h×16w without padding values. Input work batch 704a illustrates the input work batch before it is filled with the IFM content and input work batch 704b illustrates the input work batch after it has been filled. The right and bottom delta values are used to calculate the dimension of the IFM content 16h×16w with Equation 3. The calculated dimensions may be used alongside associated array position data to determine the elements of the IFM to be loaded into the second input work batch 704a. In the present example the IFM content fills the entire input work batch 704b and there are no undetermined elements. FIG. 3h illustrates the generated second input work batch 704b and corresponding work batch filter 705 for convolution in accordance with a second example of the present disclosure. The work batch filter 705 to be convolved with the first input work batch 704b is identical to the filter with dimensions 3h×3w in the present example as discussed previously. The arithmetic logic circuitry convolves the generated first input work batch 704b with the corresponding work batch filter 705 to produce the second output work batch 706.

Figure 3I:
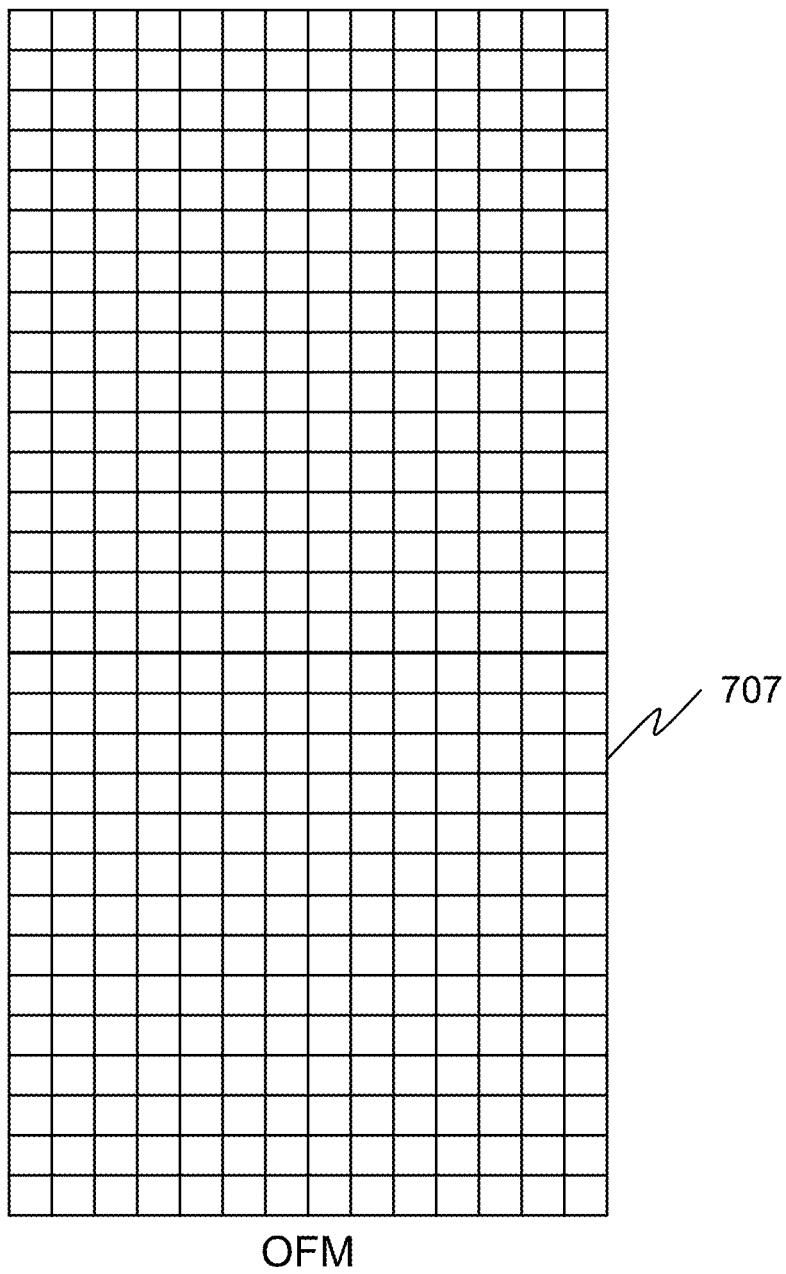

FIG. 3i illustrates an OFM 707 determined using the software-hardware mechanism by combining the first output work batch 703 and second output work batch 706 in accordance with the second example of the present disclosure. The arithmetic logic circuitry uses the output work batches and their associated locational characteristic parameters to determine the OFM 707. In the present example, the associated locational characteristic parameters indicate that the first output work batch 703 is to be placed above the second output work batch 706 to determine the OFM 707. Once determined, the OFM 707 may then be passed to the next convolution layer as the IFM for further processing.

The second example of the present disclosure provides similar advantages to those discussed in the first example. In this case, the method takes into account the different padding types which may be part of the convolutional layer's convolutional operation mode, such as a 'VALID' padding setting.

FIGS. 4a-4g show the inputs and results of a method used by the software-hardware mechanism for performing a convolution between a convolutional filter and IFM in accordance with a third example of the present disclosure. In the present example, the configuration data indicate that the convolution uses upsampling the IFM. The method shares a number of similarities with the methods discussed in the first and second examples of the present disclosure.

Figure 4A:
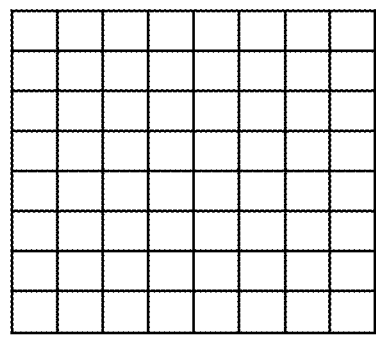
FIGS. 4a to 4g illustrate features of a method used by a software-hardware mechanism in accordance with a third example of the present disclosure.
Figure 4A:
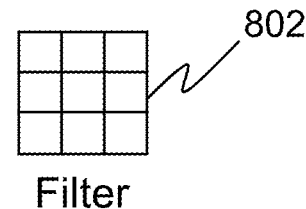
Figure 4A:
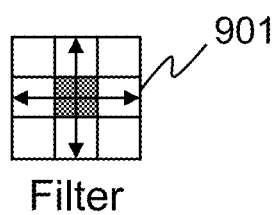
Figure 4A:
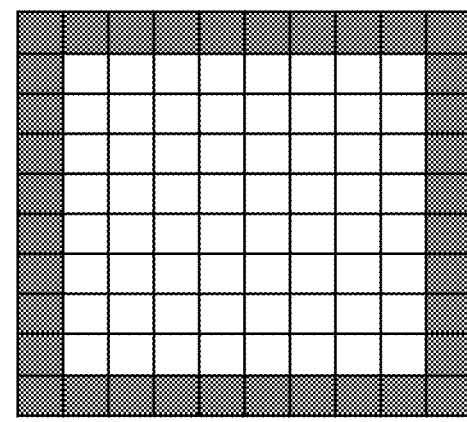

FIG. 4a illustrates an IFM 801 and filter 802 for a convolution layer of a CNN in accordance with the third example of the present disclosure. The IFM 801 has a dimension of 8h×8w, while the filter 802 has the dimensions 3h×3w. The target dimensions of the OFM are 16h×16w. It should be noted that in the present example the target dimensions of the OFM are larger than the dimensions of the IFM. The configuration data may be determined by the control processor circuitry using the target OFM dimensions or it may be input by a user using a computer communicatively coupled to the described system. The configuration data indicate that a 'SAME' padding setting is used, the filter strides one element of the IFM at a time during convolution, the IFM is to be upsampled by 2. The control processor circuitry may use the target OFM dimensions and memory capacity of the storage circuitry of the described system and number of memory accesses to determine the number and dimensions of output work batch. In the present example, the control processor circuitry has determined that four output work batches are used with equal dimensions of 8h×8w. The control processor circuitry has a global view of the IFM 903 with padded elements due to 'SAME' padding. The control processor circuitry may split the IFM 903 into four equal stripes with dimensions 4h×4w in the downsampled domain. The downsampled domain is used to describe the data associated with convolution before upsampling has occurred. The control processor circuitry also determines that the work batch filter 901 will be identical to the filter 802 with dimensions 3h×3w as the IFM stripes have elements which are all contiguous in the IFM. The work batch filter 901 is used to determine the nominal positional characteristic parameters using a method similar to that discussed in the first example, as a 'SAME' padding setting is used for this convolution. The nominal padding values are nominal top=1 and nominal left=1. The nominal delta values are nominal bottom=1 and nominal right=1. The IFM 903 illustrates the IFM in the downsampled domain with extra elements of zero value due to the 'SAME' padding setting.

Figure 4B:
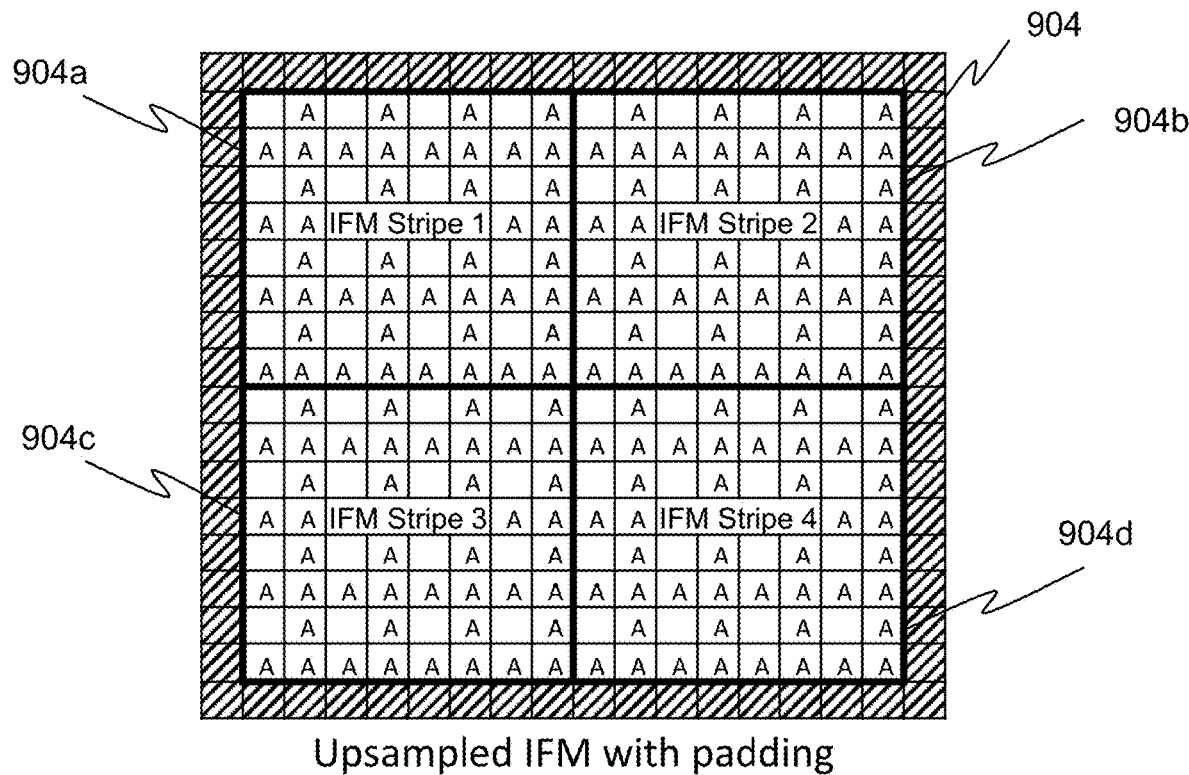

FIG. 4b illustrates the results of a method used by the software-hardware mechanism to determine the positional characteristic parameters when the convolution of the current convolutional layer includes upsampling the IFM in accordance with the third example of the present disclosure.

The control processor circuitry is aware of the IFM 904 in the upsampled domain including the padded elements with zero elements around the outside of the IFM 904 due to the 'SAME' padding setting. During upsampling, the value of the extra elements of IFM content may be calculated by taking the average of the surrounding elements, by inserting zeros, or by replicating the neighboring IFM elements. In the present example, the extra elements of IFM content are calculated by taking the average of the surrounding elements. The extra elements that would be determined through this process are indicated with the letter 'A'. Note that this also includes the elements where the number of the IFM stripe is given. The control processor circuitry may not calculate the value of the elements during this step, it may just be aware that they are implemented. In the upsampled domain, the IFM 904 stripes have dimensions 8h×8w as indicated by the first IFM stripe 904a, the second IFM stripe 904b, IFM stripe 3 904c and IFM stripe 4 904d. The delta values in this example, are determined by using an extra step for to the upsampling scenario by considering the upsampled nominal delta values. This takes into consideration the IFM content contained within the IFM stripes when they are in the upsampled domain. The nominal right and bottom delta values are upsampled appropriately. This is done by multiplying the nominal right and bottom positional characteristic parameters by the upsampling value. In the present example, the IFM is upsampled by 2, therefore the nominal right and bottom positional characteristic parameters are upsampled by 2. Therefore, the upsampled nominal delta values, upsampled nominal right=2 and upsampled nominal bottom=2. As indicated in previous examples, the nominal left and right padding values are not adjusted to determine the padding values, even in the case of upsampling.

In one example, the configuration data also indicate that bilinear deconvolution takes place for the current layer of the CNN. In this case, an extra two elements in the (one element in the downsampled domain) will be added to the upsampled nominal right and bottom delta values for the purposes of averaging. It is also important to note that once again the delta values will be adjusted depending on the dimensions of the actual IFM content. In the present example, bilinear deconvolution is not used.

Figure 4C:
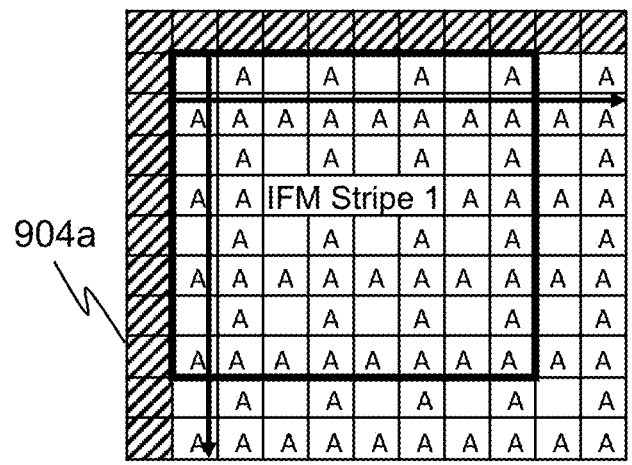
Figure 4C:
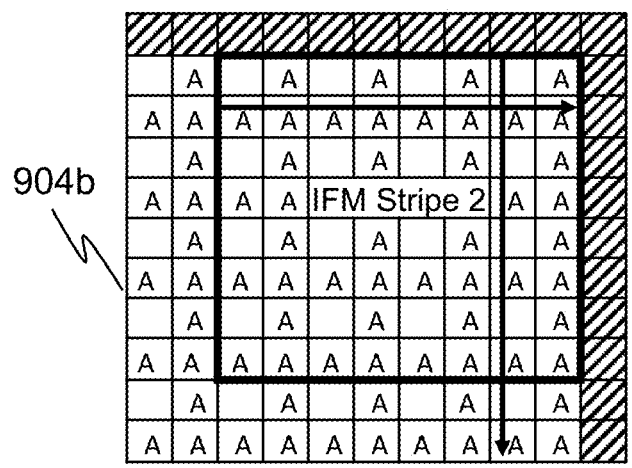
Figure 4C:
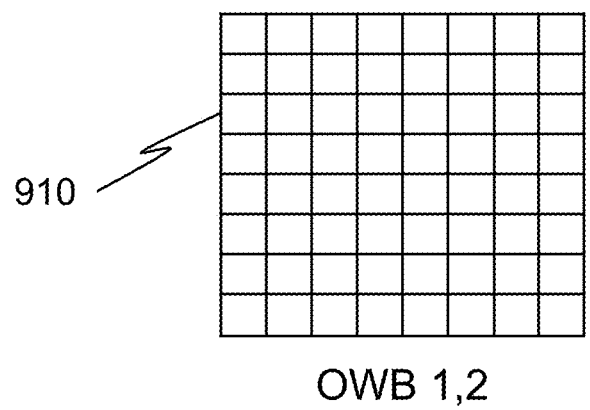

FIG. 4c illustrates the results of a method used by the software-hardware mechanism to determine the dimensional characteristic parameters and positional characteristic parameters associated with the first and second input work batches in accordance with the third example of the present disclosure. The control processor circuitry can determine from the target dimensions of the output work batch, that in the upsampled domain the dimensions of the input work batch will be 10h×10w. The elements of actual IFM content to be sent to the input work batch is to be determined. To do this the dimensions of the input work batches is to be determined in the downsampled domain. The convolution in the present example uses an upsampling of 2 and the target dimensions of the upsampled domain input work batch of 10h×10w imply that the dimensions of the input work batches in the downsampled domain would be 5h×5w, however an extra IFM content element is used to determine the extra elements calculated from the average of the surrounding elements during upsampling. The control processor circuitry therefore determines that the dimensional characteristic parameters associated with the first input work batch and second input work batch will reflect that the dimensions of the input work batch in the downsampled domain is 6h×6w.

The delta values for the first input work batch are determined by the control processor circuitry using the upsampled nominal right and bottom delta values, the target dimensions of the first output work batch 910 (8h×8w) with Equation 2 to determine the upsampled nominal IFM content dimensions. This is then compared to the IFM content contained in the first IFM stripe 904a as well as the surrounding elements as discussed in previous examples. It should be noted that the first IFM stripe 904a is presented in the upsampled domain as this is the domain used to adjust the upsampled nominal delta values to determine the delta values in the present example. The delta values for the second input work batch are also determined by the control processor circuitry using the upsampled nominal right and bottom delta values, the target dimensions of the first output work batch 910 and IFM content contained in the second IFM stripe 904b as well as the surrounding elements as discussed. For the first input work batch 904a the right delta value=2 and bottom delta value=2. For the second input work batch 904b the right delta value=0 and bottom delta value=2. The control processor circuitry may determine array position data as discussed in previous examples to determine the position of elements within the IFM. Two sets of array position data may exist, one set for the upsampled domain and one set for the downsampled domain. Where the dimensions corresponding to the combination of the output work batch dimensions 910 and upsampled nominal right and bottom delta values reaches beyond actual IFM content, the upsampled nominal right and bottom delta values are adjusted to determine the delta values. The control processor circuitry may also determine locational characteristic parameters associated with the location of the IFM content used to determine each of the input work batches. For the first input work batch 904a the locational characteristic parameters=(0,0) as the majority of the IFM content contained in the first input work batch 904a will be taken from IFM stripe 1, with IFM stripe 1 being found in the top left of the IFM where x=0 and y=0. For the second input work batch 904b the locational characteristic parameters=(1,0) as the majority of the IFM content contained in the second input work batch 904b will be taken from IFM stripe 2, with IFM stripe 2 being found in the top right of the IFM where x=1 and y=0 as IFM stripe 2 is found to be one IFM stripe along in the horizontal. As discussed previously, the nominal padding values are not adjusted, which means the padding values will be the same as their nominal values. The left and top padding values=1 for both input work batches.

Figure 4D:
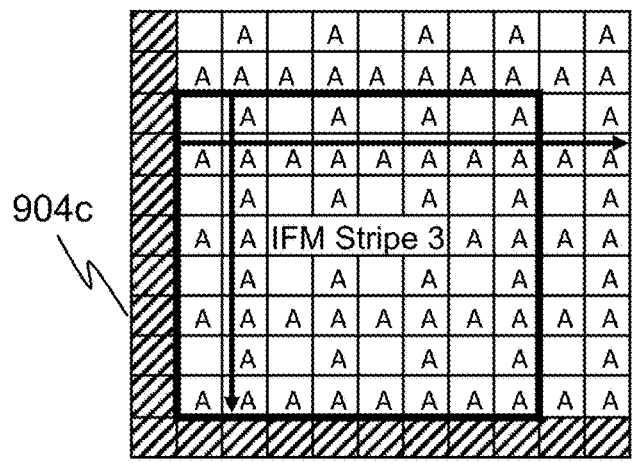
Figure 4D:
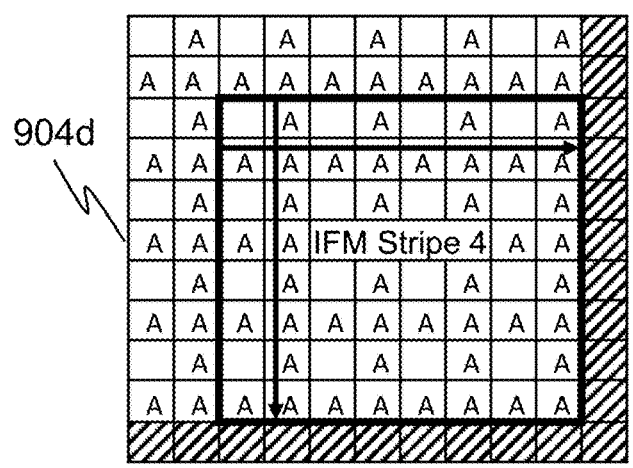
Figure 4D:
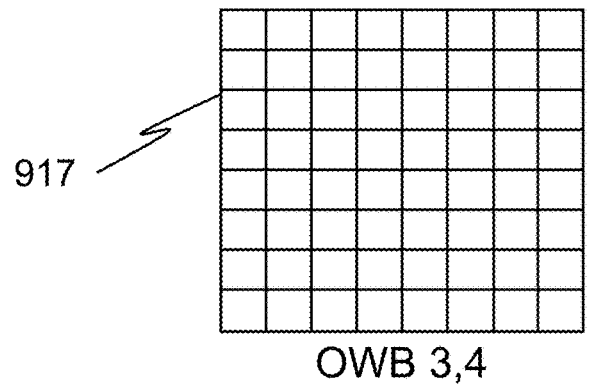

FIG. 4d illustrates the results of a method used by the software-hardware mechanism to determine the dimensional characteristic parameters and positional characteristic parameters associated with the third and fourth input work batches in accordance with the third example of the present disclosure. The method is similar to the method used to determine the dimensional characteristic parameters and positional characteristic parameters associated with the first and second input work batches. As discussed previously, the dimensional characteristic parameters associated with the third and fourth input work batches will be 6h×6w. The delta values for both the third and fourth input work batch are determined by the control processor circuitry using the upsampled nominal right and bottom delta values, the target dimensions of the third and fourth output work batch 917 (8h×8w) and the IFM content contained in IFM stripe 3 904c and IFM stripe 4 904d respectively, as well as the surrounding elements as discussed in previous examples. For the third input work batch 904c the right delta value=2 and bottom delta value=0. For the fourth input work batch 904d the right delta value=0 and bottom delta value=0. The control processor circuitry may determine array position data to determine the position of elements within the IFM. Array position data corresponding to the upsampled and down sampled domain may be determined. The control processor circuitry may also determine locational characteristic parameters associated with the location of the IFM content used to determine each of the input work batches. For the third input work batch 904c the locational characteristic parameters=(0,1) as the majority of the IFM content contained in the third input work batch 904c will be taken from IFM stripe 3, with IFM stripe 3 being found in the bottom left of the IFM where x=0 and y=1 as IFM stripe 3 is found to be one IFM stripe along in the vertical. For the fourth input work batch 904d the locational characteristic parameters=(1,1) as the majority of the IFM content contained in the fourth input work batch 904d will be taken from IFM stripe 4, with IFM stripe 4 being found in the bottom right of the IFM where x=1 and y=1 as IFM stripe 4 is found to be one IFM stripe along in the vertical and the horizontal. As discussed previously, the nominal padding values are not adjusted, which means the padding values will be the same as their nominal values. The left and top padding values=1 for both input work batches.

Figure 4E:
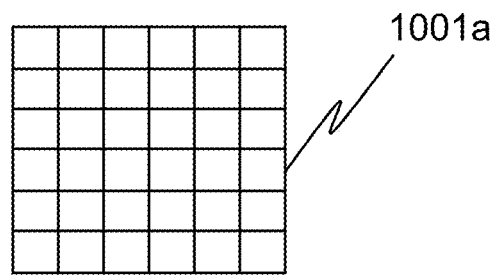
Figure 4E:
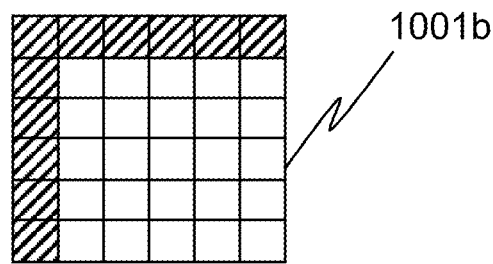
Figure 4E:
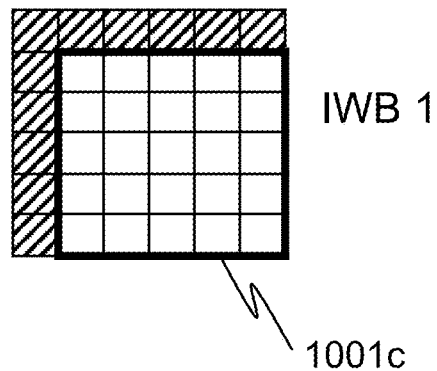

FIG. 4e illustrates the results of a method used to generate the first input work batch from the associated dimensional characteristic parameters and positional characteristic parameters in accordance with the third example of the present disclosure. The dimensional characteristic parameters may be used to generate the first input work batch 1001a in the downsampled domain. The top and left padding values indicate that padding is implemented in the topmost row and leftmost column of the first input work batch 1001b. By using the associated locational characteristic parameters and array position data it can be determined that these elements are not actual IFM content but zero values. The positional characteristic parameters and target dimensions of the output work batch 910 can be used to determine the dimensions of the IFM content to import from the first IFM stripe 904a and the surrounding elements into the first input work batch. It should be noted that both the positional characteristic parameters and dimensions of the output work batch 910 are determined in the upsampled domain so the final result, 10h×10w, is divided by the upsampling value which in this case is 2. Equation 3 can therefore be written in the more general form of Equation 4:

$$IFM\ Content = \frac{Output\ Work\ Batch\ Dimension + Delta\ Value}{Upsample\ Value} \quad (4)$$

This equation represents downsampling of the output work batch dimensions and delta values to determine an amount of IFM content to load into the input work batches. In the first and second examples the upsample value is equal to one. In the present example the control processor circuitry determines that the dimensions of the IFM content are 5h×5w. The dimensions may be used along with the array position data to determine which IFM content to import into the first input work batch 1001c. The IFM content is loaded into the first input work batch starting from the top, leftmost undetermined element. There are no undetermined elements once this step is carried out. The input work batch 1001a illustrates the input work batch before it is filled with either padding values or IFM content. The input work batch 1001b illustrates the input work batch after it is filled with initial padding values. The input work batch 1001c illustrates the input work batch after it is filled with initial padding values and IFM content.

Figure 4F:
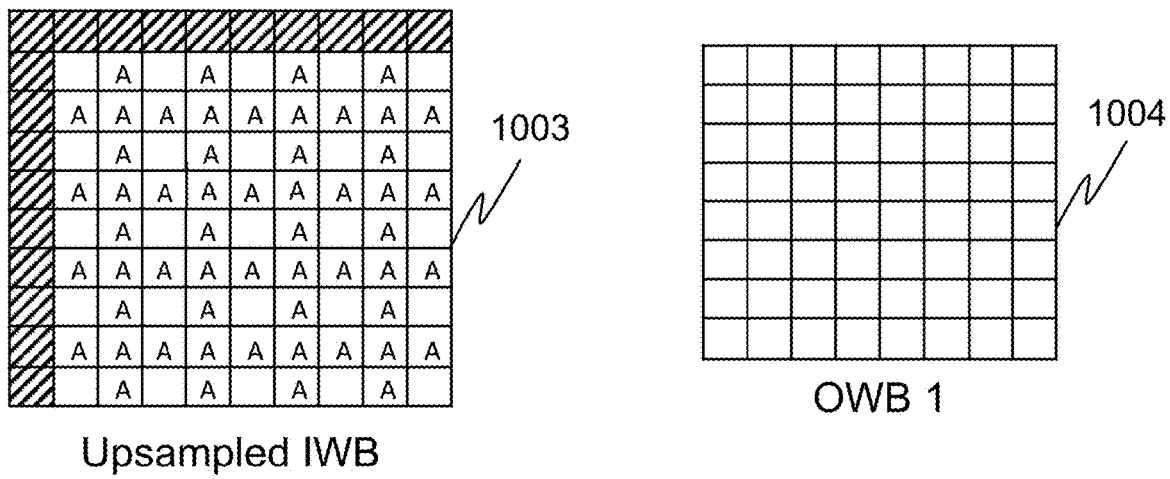
Figure 4F:
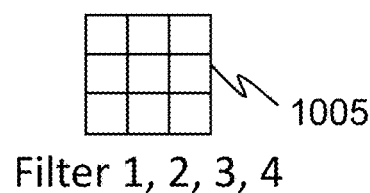
Figure 4F:
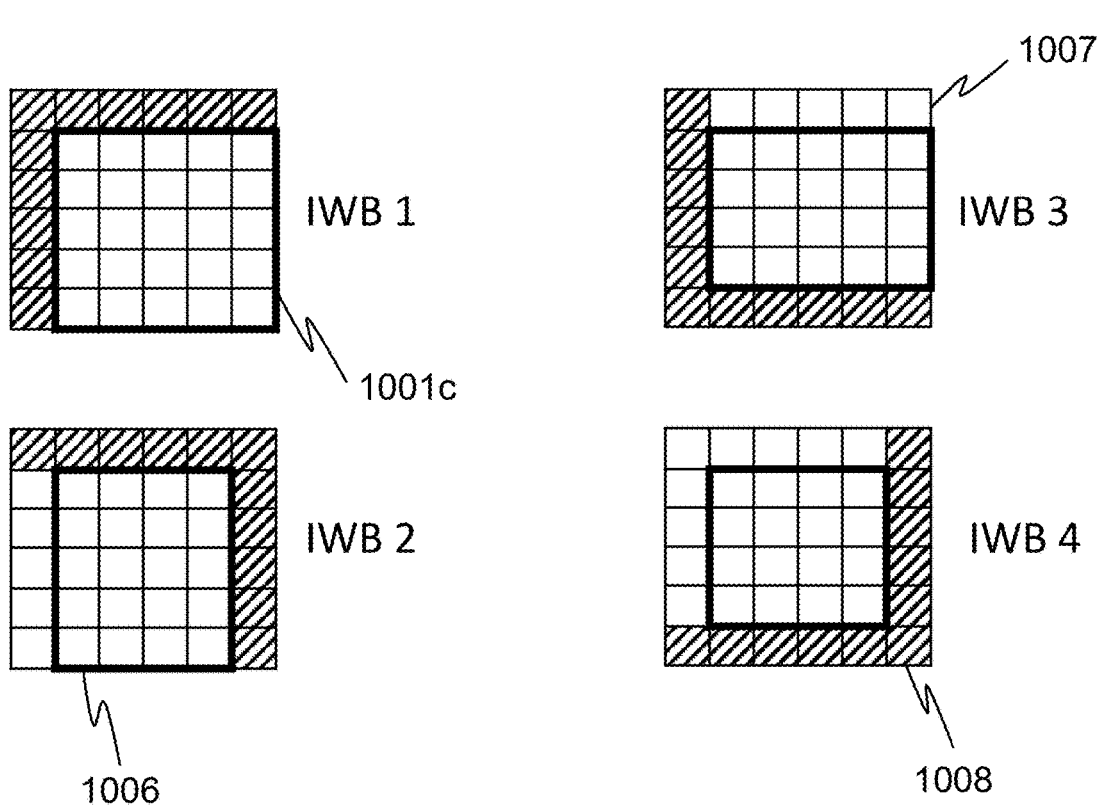
Figure 4G:
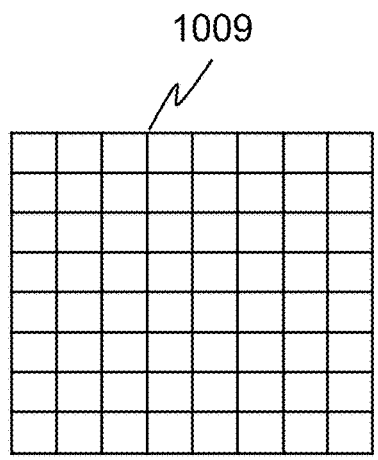
Figure 4G:
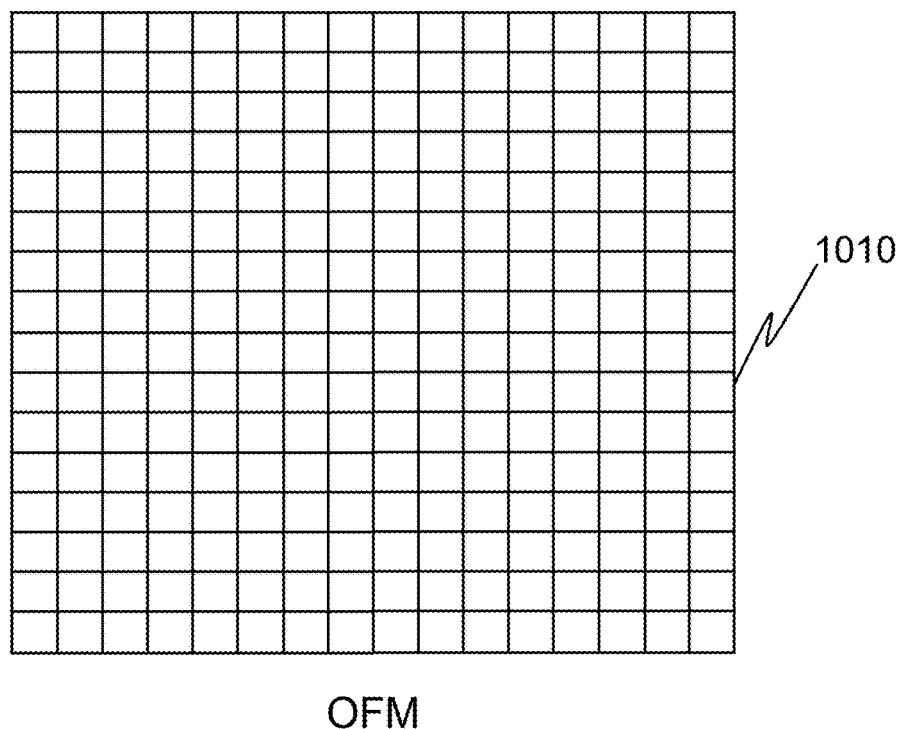

FIG. 4f illustrates the generated the first, second, third and fourth input work batch 1001c, 1006, 1007, 1008 and corresponding work batch filter 1005 for convolution in accordance with the third example of the present disclosure. The rest of the input work batch can be generated using the same method discussed previously with the associated dimensional characteristic parameters, positional characteristic parameters, array position data and output work batch dimensions. As discussed previously, the work batch filters 1005 used for each of the convolutions are identical to the filter with dimensions 3h×3w. In the present example, the convolution upsamples the input work batches by 2. The extra elements of the upsampled first input work batch 1003 may be determined by averaging the value of the surrounding elements as discussed previously. In one example the upsampled input work batches are determined by the control processor circuitry before being transferred to the arithmetic logic circuitry. In another example the arithmetic logic circuitry determines the upsampled input work batches for convolution. The arithmetic logic circuitry convolves the upsampled first input work batch 1003 with the corresponding work batch filter 1005 to produce the first output work batch 1005. FIG. 4g illustrates the determined output work batches 1009 from convolution as well the method for determining OFM 1010 in accordance with the third example of the present disclosure. The rest of the output work batches 1009 associated with the second, third and fourth input work batches can be determined using a method similar to that discussed previously. The locational characteristic parameters associated with each of the output work batches 1009 can be used to determine the final OFM 1010 using a method similar to that discussed in previous examples.

The third example of the present disclosure provides similar advantages to those discussed in previous examples. In this case, the method takes into account when the IFM is upsampled to determine an OFM of larger dimensions than itself, as informed by the configuration data. The method discussed, which upsamples the positional characteristic parameters and then downsamples them, ensures that enough IFM content is loaded into the input work batches to calculate the extra elements which are determined during the upsampling of the input work batches during convolution. This method may also be used when the configuration data indicate that bilinear deconvolution takes place for the layer of the CNN.

FIGS. 5a-5e show the inputs and results of a method used by the software-hardware mechanism for performing a convolution between a convolutional filter and IFM in accordance with a fourth example of the present disclosure. In the present example, the configuration data indicate that the filter strides the IFM two elements at a time in both the horizontal and vertical (2×2) during convolution. The method shares a number of similarities with the method discussed for the first, second and third examples of the present disclosure.

Figure 5A:
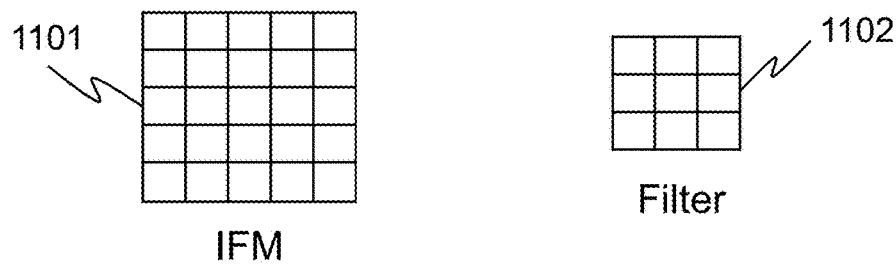
FIGS. 5a to 5e illustrate features of a method used by a software-hardware mechanism in accordance with a fourth example of the present disclosure.
Figure 5A:
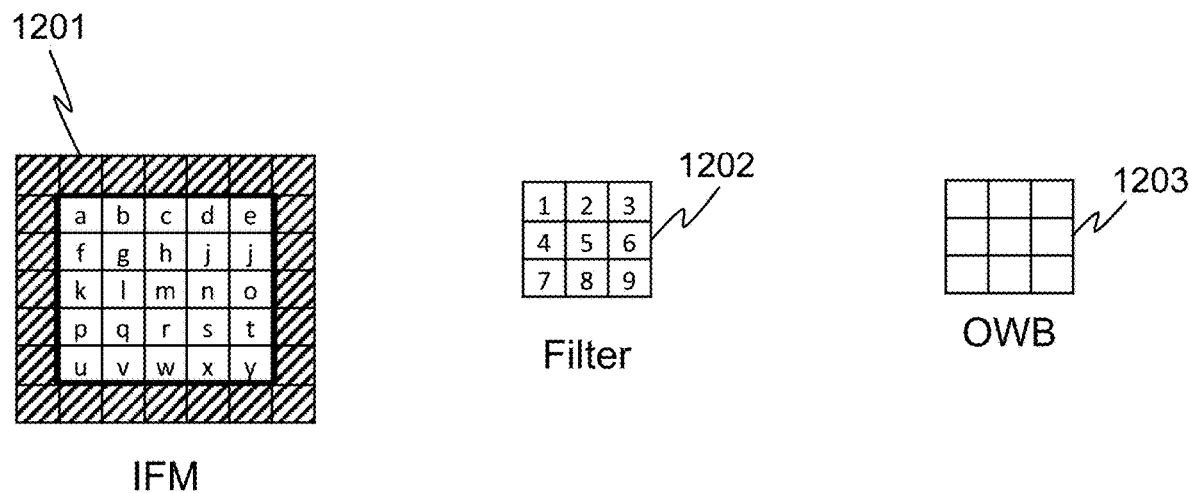

FIG. 5a illustrates an IFM 1101 and filter 1102 for a convolution layer of a CNN in accordance with a fourth example of the present disclosure. The IFM 1101 has the dimensions of 5h×5w, while the filter 1102 has the dimensions 3h×3w. The target dimensions of the OFM are 3h×3w. It should be noted that in the present example the target dimensions of the OFM are far smaller than the dimensions of the IFM. The configuration data may be determined by the control processor circuitry using the OFM dimensions or it may be input by a user using a computer which is communicatively coupled to the described system. The configuration data indicates a 'SAME' padding setting, that the filter strides across the IFM two elements at a time in both the horizontal and the vertical axis and that upsampling is not used. In the present example, the IFM is sub-sampled to form sub-IFMs as the filter strides the IFM by more than one element in the horizontal and vertical axis. The method demonstrated in this present example is used if either the horizontal or vertical stride is more than a value of one. The control processor circuitry may determine a number of sub-IFM to split the IFM into for convolution by multiplying the stride values R×S which are 2×2 in the present example. The control processor circuitry is aware of the IFM 1201 for convolution including the padding elements which are used in the present example as the convolution includes a 'SAME' padding setting. As discussed previously, the control processor circuitry may determine array position data associated with each element of IFM content as demonstrated. The control processor circuitry may also determine array position data associated with each element of the filter 1202. The control processor circuitry may use the array position data associated with the IFM 1201 and filter 1202 to determine which elements of the filter 1202 will interact with the IFM 1201 during convolution. The elements of the filter 1202 which interact with the elements of the IFM 1201 will be grouped together to form the sub-IFMs and work batch filter. In doing this, each output work batch 1203 produced by convolving the sub-IFM and work batch filter will have the dimensions 3h×3w. This will be reflected in the dimensional characteristic parameters associated with each input work batch as determined by the control processor circuitry.

Figure 5B:
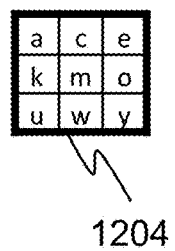
Figure 5B:
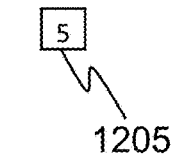
Figure 5B:
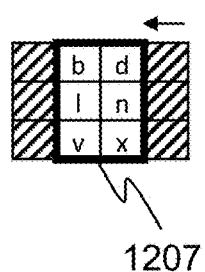
Figure 5B:
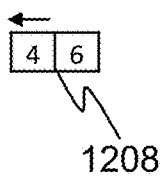
Figure 5B:
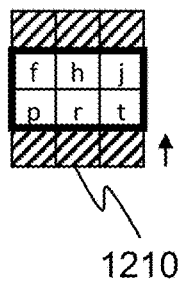
Figure 5B:
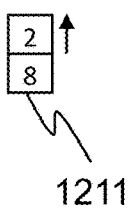
Figure 5B:
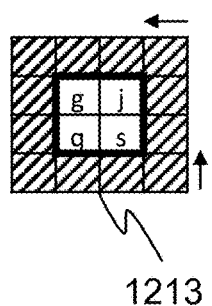
Figure 5B:
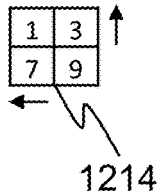

FIG. 5b illustrates a sub-IFM and work batch filter determined by the software-hardware mechanism as well as the determination of their associated positional characteristic parameters in accordance with the fourth example of the present disclosure. It should be noted that the elements of the IFM contained in the sub-IFM may be noncontiguous. The noncontiguous elements in the sub-IFM may not be adjacent to the elements that they are adjacent to in the IFM. The control processor circuitry determines the sub-IFM and work batch filter corresponding to the input work batch using the method discussed previously. The control processor circuitry may use the work batch filter to determine the nominal positional characteristic parameters associated with each input work batch using a method similar to that discussed in previous examples. The control processor circuitry determines the center point of the work batch filter using Equation 1 and then counts the dimensional extent of elements to the left, top, bottom and right of the center point. In the present example, the nominal positional characteristic parameters are different for each input work batch. For example, the first work batch filter 1205 has the dimensions 1h×1w. The single element is therefore the center point of the work batch filter 1205 and there are no elements left, above, right and below the center point meaning that all nominal positional characteristic parameters have a value of zero. In another example, the second work batch filter 1208 is 1h×2w with the center point of the work batch filter determined to be element 6 of the filter. The control processor circuitry may use this to determine that nominal padding value left has a value of 1 and all other nominal positional characteristic parameters have the value zero. The same method can be used to determine the nominal positional characteristic parameters from the third work batch filter 1211 and fourth work batch filter 1214 associated with the third and fourth input work batch respectively.

The determined nominal positional characteristic parameters, sub-IFMs, dimensions of the output work batches and array position data associated with each input work batch can be used to determine the positional characteristic parameters using a method similar to that described in previous examples. As demonstrated in previous examples, the left and top nominal padding values remain the same as the left and top padding values. The control processor circuitry will compare the nominal IFM content as calculated by Equation 2 with the actual IFM content contained in the relevant sub-IFM, adjusting the right and bottom nominal delta values based on the actual IFM content extent contained in the associated sub-IFM. For example, for the first input work batch, the nominal IFM dimensions are 3h×3w. Comparing the nominal IFM content dimensions with the dimensions of the actual IFM content in the first sub-IFM 1204 using the array position data illustrates that there is no adjustment of the right and bottom nominal delta values and they remain the same for the delta values. In another example the second input work batch produces nominal IFM content dimensions of 3h×3w. When this dimension is compared to the actual IFM content contained in the second sub-IFM 1207 it is found that the IFM content has the dimensions of 3h×2w and therefore the right nominal delta value must be adjusted to a value of −1 for the delta values. In a further example the third input work batch produces nominal IFM content dimensions of 3h×3w. When this dimension is compared to the actual IFM content contained in third sub-IFM 1210 it is found that the IFM content is 2h×3w and therefore the bottom nominal delta value must be adjusted to a value of −1 for the delta values. In a final example, the fourth input work batch produces nominal IFM content dimensions of 3h×3w. When the dimensions are compared to the actual IFM content contained in the fourth sub-IFM 1213 it is found that the IFM content is 2h×2w and therefore both the right bottom nominal delta values must be adjusted to the value of −1 for the delta values. The padding values are left=0 and top=0 for the first input work batch. The delta values are right=0 and bottom=0 for the first input work batch. The padding values are left=1 and top=0 for the second input work batch. The delta values are right=−1 and bottom=0 for the second input work batch. The padding values are left=0 and top=1 for the third input work batch. The delta values are right=0 and bottom=−1 for the third input work batch. The padding values are left=1 and top=1 for the fourth input work batch. The delta values are right=−1 and bottom=−1 for the fourth input work batch.

Figure 5C:
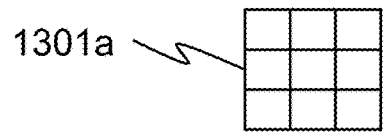
Figure 5C:
Figure 5C:
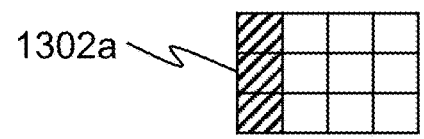
Figure 5C:
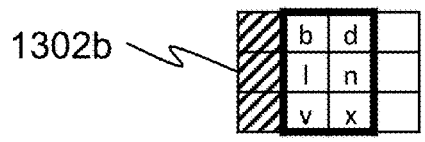
Figure 5C:

FIG. 5c illustrates the results of a method used to generate the first and second input work batch in accordance with the fourth example of the present disclosure. The control processor circuitry uses the dimensions of the first and second work batch filter and dimensions of the first and second output work batch to determine the dimensions of the first input work batch and second input work batch respectively using a method similar to that discussed in previous examples. The first input work batch has the dimensions 3h×3w and the second input work batch has the dimensions 3h×4w. The associated dimensional characteristic parameters and positional characteristic parameters may be used to generate the input work batch. In one example the input work batch are generated by the control processor circuitry and then transferred to the arithmetic logic circuitry for convolution. In another example the input work batch are generated by the arithmetic logic circuitry for convolution. The first dimensional characteristic parameters and second dimensional characteristic parameters may be used to generate the first input work batch 1301*a* and second input work batch 1217 respectively. The input work batch 1301*a* illustrates the first input work batch before it is filled using the associated padding values and IFM content and the input work batch 1301*b* illustrates the first input work batch after it is filled with IFM content. The input work batch 1302*a* illustrates the second input work batch after it is partly filled using padding which has zero values and the input work batch 1302*b* illustrates the second input work batch after it is filled with IFM content. The input work batch 1302*c* illustrates the second input work batch after the unfilled elements are filled using padding which has zero values. The top and left padding values indicate that there is no padding used for the first input work batch. The left padding values indicate that there is one column of padding implemented to the left of the second input work batch with the associated array position data indicating this is not actual IFM content but zero values. The associated delta values and target dimensions of the first and second output work batch can be used to determine the dimensions of the IFM content to import from sub-IFM 1 and sub-IFM 2 into the first input work batch and second input work batch respectively, using Equation 3. Equation 4 may also be used as the upsample value will be one for the present example. This produces the IFM content dimensions of 3h×3w for the first input work batch 1301*a* and the dimensions of 3h×2w for the second input work batch 1302*a*. The IFM content dimensions may be used along with the array position data to determine which sub-IFM content to import into the input work batches. The IFM content is loaded into the input work batch starting from the top, leftmost undetermined element. There are no undetermined elements once the IFM content is filled for the first input work batch 1301*b*. For the second input work batch 1302*b* there are still undetermined elements which are padded with zero values.

Figure 5D:
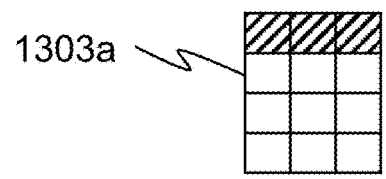
Figure 5D:
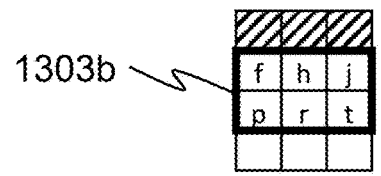
Figure 5D:
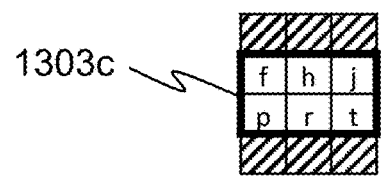
Figure 5D:
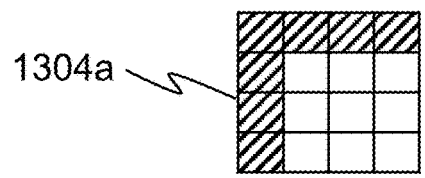
Figure 5D:
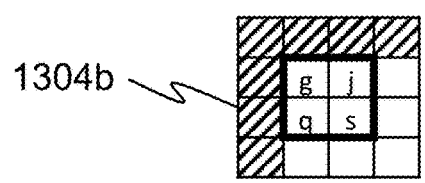
Figure 5D:
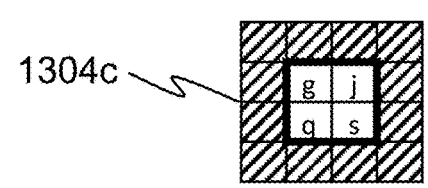

FIG. 5*d* illustrates the results of a method used to generate the third and fourth input work batches in accordance with a fourth example of the present disclosure. The method shares a number of similarities with the method discussed for determining the associated dimensional characteristic parameters and positional characteristic parameters for the first and second input work batches of the present example. The control processor circuitry uses the dimensions of the third and fourth work batch filters and dimensions of the third and fourth output work batches to determine the dimensions of the third input work batch 1218 and fourth input work batch 1219 respectively using a method similar to that discussed in previous examples. The third input work batch has the dimensions 4h×3w and the fourth input work batch has the dimensions 4h×4w. The associated dimensional characteristic parameters and positional characteristic parameters may be used to generate the input work batches. The third dimensional characteristic parameters 1218 and fourth dimensional characteristic parameters 1219 may be used to generate the third input work batch 1303*a* and fourth input work batch 1304*a* respectively. The top padding value indicates that there is one row of padded values at the top of the third input work batch with the associated array position data indicating this is not actual IFM content and therefore the third input work batch will have a row of zero values at its top. The left and bottom delta values indicate that there is one column of padded values and one row of padded values at the left and top of the fourth input work batch with the associated array position data indicating that neither is actual IFM content and therefore the fourth input work batch will have a column and row of zero values to the left and top.

The associated delta values and target dimensions of the third and fourth output work batches can be used to determine the dimensions of the IFM content to import from sub-IFM 3 and sub-IFM 4 into the third input work batch and fourth input work batch respectively, using Equation 3. This produces the dimensions of 2h×3w for the third input work batch 1303*a* and the dimensions of 2h×2w for the fourth input work batch 1304*a*. The dimensions may be used along with the array position data to determine which sub-IFM content to import into the input work batches. The IFM content is loaded into the input work batch starting from the top, leftmost undetermined element. For the third input work batch 1303*b* and fourth input work batch 1304*b* there are still undetermined elements which are padded with zero values.

Figure 5E:
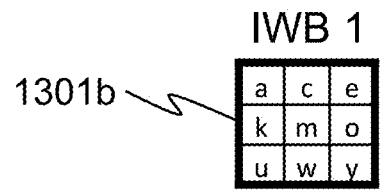
Figure 5E:
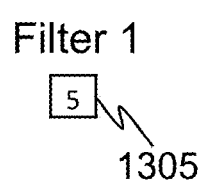
Figure 5E:
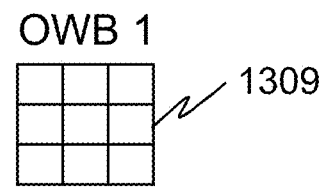
Figure 5E:
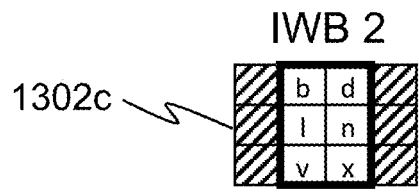
Figure 5E:
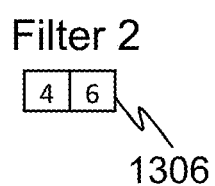
Figure 5E:
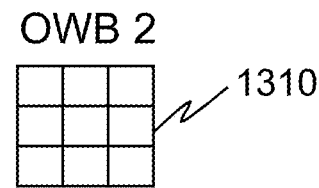
Figure 5E:
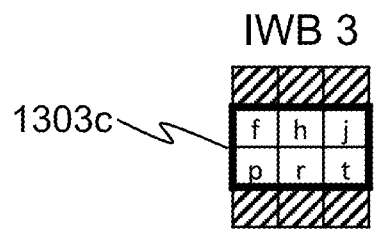
Figure 5E:
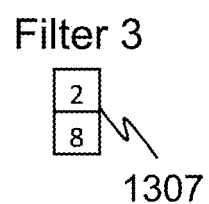
Figure 5E:
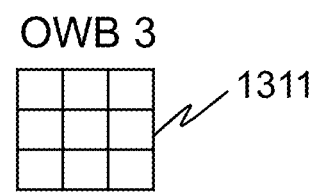
Figure 5E:
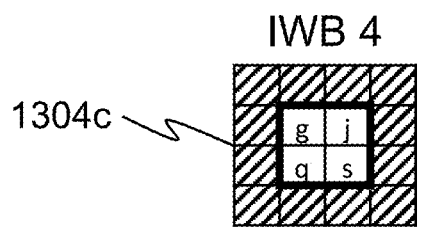
Figure 5E:
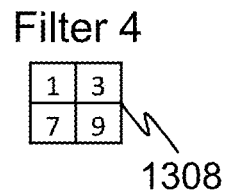
Figure 5E:
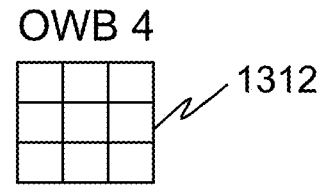
Figure 5E:
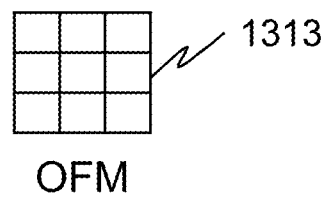

FIG. 5*e* illustrates the generated first, second, third and fourth input work batch 1301*b*, 1302*c*, 1303*c*, 1304*c* and corresponding first, second, third and fourth work batch filter 1305, 1306, 1307, 1308 for convolution in accordance with the fourth example of the present disclosure. The arithmetic logic circuitry convolves the input work batch with the corresponding work batch filter to determine the associated output work batch. It should be noted that due to the subsampling of the IFM and filter, the convolutions which are carried out with the sub-IFM and work batch filter will stride the sub-IFM one element at a time in both the horizontal and vertical axis. The convolution of the first input work batch 1301*b* with the first work batch filter 1305 determines the first output work batch 1309. The convolution of the second input work batch 1302*c* with the second work batch filter 1306 determines the second output work batch 1310. The convolution of the third input work batch 1303*c* with the third work batch filter 1307 determines the third output work batch 1311. The convolution of the fourth input work batch 1304*c* with the fourth work batch filter 1308 determines the fourth output work batch 1312. The determined output work batches can then be combined by adding the corresponding elements of the output work batches together to determine the OFM 1313. This may be achieved through the determination of array position data associated with the position of each element of the output work batch.

It should be noted that the method demonstrated in this example can be used for performing a convolution between a convolutional filter and IFM where the configuration data indicate that a dilated convolution is performed. In the dilated convolution case, the IFM is once again sub-sampled to form sub-IFMs by determining which elements of the IFM will interact with the elements of the dilated filter during convolution. The control processor circuitry may determine array position data associated with each element of IFM content. The control processor circuitry may also determine array position data associated with each element of the filter. The control processor circuitry may use the array position data associated with the IFM and filter to determine which elements of the filter will interact with the IFM 1201 during the dilated convolution. The elements of the filter which interact with the elements of the IFM will be grouped together to form the sub-IFMs and work batch filter. The sub-IFMs and work batch filters can then be used in the same manner as demonstrated above to determine dimensional characteristic parameters and positional characteristic parameters and use these to generate the work batches which are then convolved.

The fourth example of the present disclosure provide similar advantages to those discussed in previous examples. In this case, the method takes into account when the stride of the filter across the IFM is determined to be greater than one in either the horizontal or the vertical axis. Constructing the input work batches from noncontiguous IFM content indicative of the sub-IFM allows for the stride of the filter across the input work batch during the convolution to be one element at a time in both the horizontal and vertical axis. This can be achieved with simpler logic components in the arithmetic logic circuitry. It also allows for the convolution to be split up into more manageable chunks improving the efficiency of the described system.

It should be noted that in each of the examples presented in this disclosure, the depth of the IFM and filter data has had a value of one. The method disclosed in each example can be generalized to an IFM and filter data with a depth that is greater than one element. The target OFM dimensions may have a height, a width and a depth and these dimensions can be taken into consideration when determining the number and dimensions of each of the respective work batches. In the same way it has been demonstrated that the height and width of the target OFM, memory capacity and number of memory accesses can be used to determine output work batch dimensions, this concept can also be extended to determine a depth associated with the output work batch dimensions. The value of the depth of the output work batches may be such that they make up sections of the depth of the target dimensions of the OFM. The dimensions of the output work batches including the depth can then also be used to determine the dimensions of the input work batches including the depth. Along with the work batch filter, these dimensions can then be used to determine dimensional characteristic parameters and positional characteristic parameters which will include further parameters for the depth of the work batches. Once the input work batches and filter work batches are generated, they can be convolved to determine the output work batches. Taking into account that these output work batches will also have an associated depth, these may also need to be combined or accumulated in depth to determine the OFM.

Figure 6:
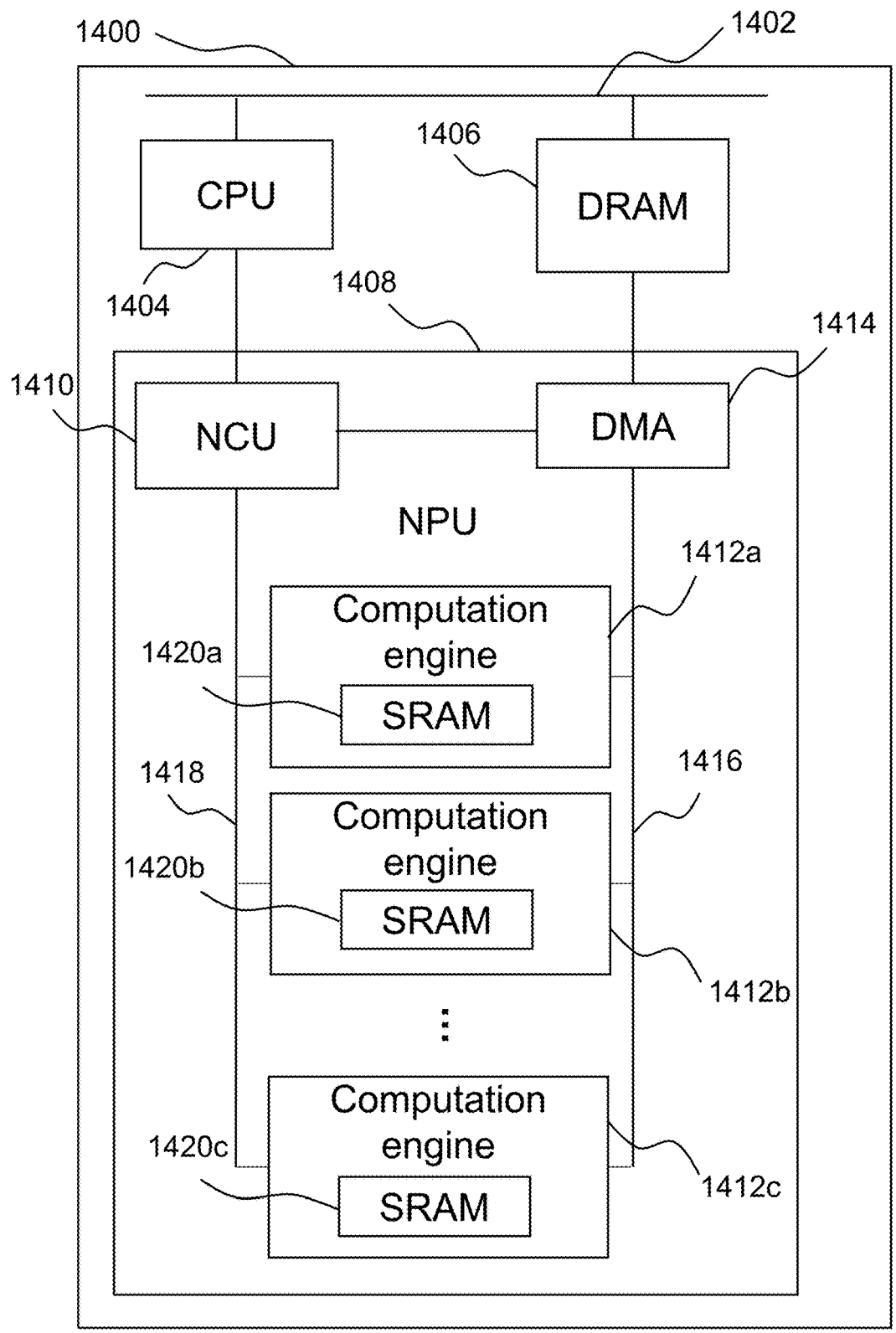
FIG. 6 is a schematic block diagram showing a neural processing system arranged in accordance with examples of the present disclosure.

FIG. 6 illustrates an example of a neural processing system 1400 arranged to operate in accordance with the above-described examples of the present disclosure. A system bus 1402 is connected to a CPU 1404 and DRAM 1406, though it will be appreciated that the system bus can also be connected to other components such as a graphic processing unit (GPU), network interfaces, non-volatile storage and input/output devices. The control processor circuitry may be contained in the CPU 1404. The IFM, filter and configuration data for various convolutional layers may be stored in the DRAM 1406. This data may also be fetched and stored in SRAM contained in the CPU 1404 during processing. The CPU 1404 may contain instructions in storage circuitry which allow it to carry out the methods described in the various examples discussed in the present disclosure. In one example, the CPU 1404 contains instructions in storage circuitry which allow it to generate the input work batches and work batch filters. As discussed previously the input work batches may be generated by fetching from the storage circuitry IFM content by using the dimensional characteristic parameters and positional characteristic parameters and placing it in a data buffer. The work batch filters may be generated by fetching from the storage circuitry appropriate filter data and placing it in the data buffer. The data buffer may be contained in storage circuitry such as SRAM found in the CPU 1404. The generated input work batches and work batch filters may be transferred from the CPU to the SRAM 1420 of the computation engines 1412 for convolution. The SRAM 1420 of the computation engines 1412 may also contain a data buffer. The CPU 1404 has access to the IFM, filter and configuration data contained within the DRAM 1406 which allows it to determine the dimensional characteristic parameters, positional characteristic parameters, locational characteristic parameters and array position data. The neural processing system 1400 also includes an NPU 1408 containing specialized circuitry for neural network processing. The NPU may be optimized to perform convolutions efficiently and contains components composed of arithmetic logic circuitry which are used to perform convolutions between the input work batches and work batch filters.

The NPU 1408 contains a neural control unit (NCU) 1410 which generates control data for one or more computation engines 1412 and a direct memory access (DMA) 1414. The dimensional characteristic parameters, positional characteristic parameters, locational characteristic parameters and array position data may be sent to the NCU 1410 from the CPU 1404 for it to generate the control data based upon it. In one example, the NCU 1410 contains instructions in storage circuitry which allow it to generate the input work batches and work batch filters by accessing the IFM and filter contained in the DRAM 1406. The generation of the input work batches and work batch filters may be achieved by fetching IFM content and filter data content to a data buffer which is contained within the SRAM 1420 of computation engines 1412. The control processor circuitry may be contained in the NCU 1410. The NCU 1410 may contain instructions in storage circuitry which allow it to carry out the methods described in the various examples discussed in the present disclosure. The NCU 1410 has access to the IFM, filter and configuration data contained within the DRAM 1406 which allows it to determine the dimensional characteristic parameters, positional characteristic parameters, locational characteristic parameters and array position data. This data may be stored in SRAM contained within the NCU 1410. FIG. 6 illustrates 3 computation engines 1412*a*, 1412*b*, 1412*c*, though it will be appreciated that a different number of computation engines can be utilized in the neural processing system without departing from the scope of the disclosure. Data is sent from the DRAM 1406 and is received by the computation engine 1412 via the DMA 1414 and main data channel 1416. This data may include IFM and filter elements within a given CNN layer. The computation engines 1412 are arranged to process the data in accordance with control data received from the NCU 1410 via a control data channel 1418. Each computation engine includes SRAM 1420 and processing circuitry configured to retrieve data stored by the SRAM 1420. The SRAM 1420 may contain the data buffer containing the generated input work batches and work batch filters before convolution and the output work batch after convolution as well as control data or programs. The computation engines contain components composed of arithmetic logic circuitry which is used to perform convolutions between the input work batches and work batch filters.

Figure 7:
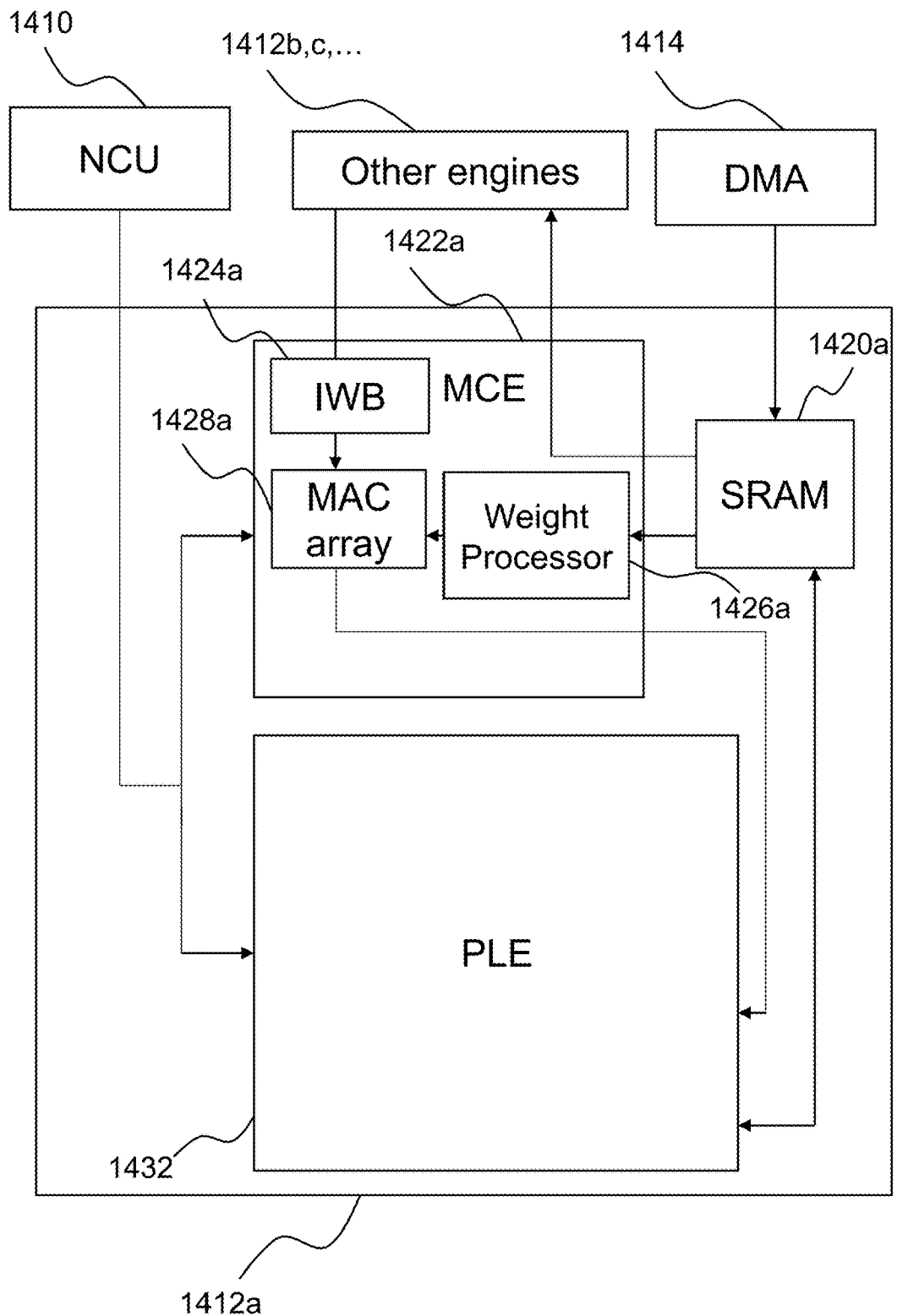
FIG. 7 illustrates a schematic block diagram of a computation engine of the neural processing system of FIG. 6.

FIG. 7 is a schematic diagram showing computation engine 1412*a* in more detail. In the present example, the other computation engines 1412*b*, 1412*c* include the same components. The computation engine includes a multiply-accumulate (MAC) computation engine (MCE) 1422*a* which processes data retrieved from the SRAM 1420*a* in accordance with control data from the NCU 1410. The MCE is composed of arithmetic logic circuitry. The MCE 1422*a* passes the input work batch 1424*a* and work batch filter from the weight processor 1426*a* to the MAC array. The input work batch may be fetched from a data buffer contained within the SRAM 1420a, or it may be fetched from another data buffer stored in the SRAM of another compute engine. The work batch filter may be fetched from a data buffer contained within the SRAM 1420a. The input work batch and work batch filter may have been fetched together into the data buffer of the SRAM 1420a so that they are associated in a way that it is known they are to be convolved by the MAC array 1428a. The weight processor 1426a may be configured to pre-process the work batch filter before it reaches the MAC array 1428a. The MAC array 1428a contains a number of MAC units and accumulators for performing convolutions in parallel. In accordance with the present example, the MAC array 1428a is configured to perform a convolution between an associated input work batch and work batch filter to generate an output work batch. Convolutions involving the multiple input work batches and work batch filters associated with the convolution layer may be performed in parallel using the multiple compute engines. In the present example, the MAC array 1428a includes an array of accumulators. In one example the MAC array 1428a is arranged to combine output work batches using locational characteristic parameters to generate an OFM. In another example, the MAC array 1428a is arranged to sum corresponding elements of output work batch to generate the OFM.

In another example the MAC array 1428a is arranged to transmit the output work batches to a programmable layer engine (PLE) 1432. The PLE may contain arithmetic logic circuitry and is arranged to perform additional processing operations on the output work batches, including pool operations and applying activation functions and can also be programmed to perform a number of operations on different layers of the CNN, allowing for a broad range of CNN architectures to be implemented. The PLE 1432 is arranged to output the processed output work batches to the SRAM 14020a of the computation engine. The PLE may be arranged to combine the output work batches post processing to determine the OFM. In the context of a CNN, the OFM data becomes the IFM data for the next layer in the CNN which may be a further convolutional layer or a fully connected layer. The processed data may be broadcast to other computation engines 1412 for further processing or may be output to the DRAM 1406 of the neural processing system 1400.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure, which is defined in the accompanying claims.

What is claimed is:

1. A computer-implemented method of performing a convolution between an input feature map and convolutional filter data, performed by a neural processing system in a chipset, the neural processing system comprising control processor circuitry and arithmetic logic circuitry, the method comprising:
   in the control processor circuitry:
      receiving:
         convolution configuration data relating to the convolution to be performed and comprising a padding setting;
      determining, from the convolution configuration data:
         one or more dimensional characteristic parameters relating to dimensions of each of a plurality of input work batch data arrays corresponding to a convolution to be performed;
         one or more positional characteristic parameters relating to positions of feature map content within the plurality of input work batch data arrays, wherein the positional characteristic parameters comprise at least one delta value that indicates an extent of the input feature map within an input work batch data array, the at least one delta value being determined based at least in part on the one or more dimensional characteristic parameters and a nominal value, the nominal value defined according to a padding setting that indicates at least one of: no extra rows or columns of values are to be added during convolution and one or more padding elements are to be added around the input feature map; and
         the dimensions of one or more variable-dimension work batch filter data arrays corresponding to partial sections of the convolutional filter data based at least in part on the input feature map and the convolutional filter data;
      fetching the one or more variable work-batch filter data arrays and storing them in a storage; and
      generating the plurality of input work batch data arrays by retrieving portions of input feature map data and storing each input work batch data array in the storage based at least in part on:
         the one or more dimensional characteristic parameters; and
         the one or more positional characteristic parameters,
   in the arithmetic logic processing circuitry:
      receiving from the storage:
         the plurality of input work batch data arrays; and
         the one or more variable-dimension work batch filter data arrays;
      performing convolutions between:
         the plurality of input work batch data arrays, and the one or more variable-dimension work batch filter data arrays, to produce a plurality of output work batch data arrays which are suitable for being combined to generate an output feature map.

2. The method of claim 1, wherein the method comprises: determining one or more locational characteristic parameters relating to the relative locations of the feature map content in each of the plurality of input work batch data arrays; and combining the plurality of output work batch data arrays based on the one or more locational characteristic parameters to generate the output feature map.

3. The method of claim 1, wherein the method comprises:
   in the control processor circuitry:
      determining a plurality of array position data from the input feature map based on the one or more positional characteristics; and
      determining the positions of feature map content within the plurality of input work batch data arrays based on the plurality of array position data.

4. The method of claim 1, wherein the plurality of input work batch data arrays are generated from the input feature map based at least in part on dimensions of the plurality of output work batch data arrays.

5. The method of claim 1, wherein the one or more positional characteristic parameters relates to an amount of edge elements required by the one or more input work batch data arrays.

6. The method of claim 1, in which each of the plurality of input work batch data arrays are generated from the input feature map by loading input feature map elements from contiguous areas of the input feature map into each input work batch data array respectively.

7. The method of claim 1, in which each of the plurality of input work batch data arrays are generated from the input feature map by loading input feature map elements from noncontiguous areas of the input feature map into each input work batch data array respectively.

8. The method of claim 1, wherein the method comprises upsampling the one or more positional characteristic parameters.

9. The method of claim 1, wherein the method comprises downsampling one or more positional characteristic parameters to determine the amount of input feature map content required by the one or more input work batch data arrays.

10. The method of claim 1, wherein the method comprises upsampling the input work batch data arrays for convolution.

11. The method of claim 2, wherein the method comprises determining the one or more positional characteristic parameters based on the convolution configuration data indicating a bilinear deconvolution.

12. The method of claim 2, wherein the method comprises receiving output feature map dimensions as part of the convolution configuration data.

13. The method of claim 2, wherein the method comprises:
receiving a convolutional operation mode as part of the convolution configuration data; and
determining the output feature map dimensions using the convolutional operation mode.

14. The method of claim 13, wherein the convolutional operation mode includes at least one of: feature map striding, filter dilation, feature map upsampling, and feature map downsampling.

15. A neural processing system in a chipset comprising:
storage circuitry arranged to store an input feature map, convolutional filter data, and an output feature map;
control processor circuitry arranged to:
receive:
convolution configuration data relating to a convolution to be performed and comprising a padding setting;
determine, from the convolution configuration data:
one or more dimensional characteristic parameters relating to dimensions of each of a plurality of input work batch data arrays corresponding to the convolution to be performed;
one or more positional characteristic parameters relating to positions of feature map content within the plurality of input work batch data arrays wherein the positional characteristic parameters comprise at least one delta value that indicates an extent of the input feature map within an input work batch data array, wherein the at least one delta value is determined based at least in part on the one or more dimensional characteristic parameters and a nominal value, the nominal value defined according to a padding setting that indicates at least one of: no extra rows or columns of values are to be added during convolution and one or more padding elements are to be added around the input feature map; and
the dimensions of the one of the one or more variable-dimension work batch filter data arrays based at least in part on the input feature map and the convolutional filter data;
fetch the one or more variable work-batch filter data arrays and store them in a storage; and
generate the plurality of input work batch data arrays by retrieving portions of input feature map data from the storage based at least in part on:
the one or more dimensional characteristic parameters; and
the one or more positional characteristic parameters; and
provide the plurality of input work batch data arrays and the one or more variable-dimension work batch filter data arrays corresponding to partial sections of the convolutional filter data to arithmetic logic processing circuitry to perform convolution processing.

16. A neural processing system in a chipset comprising:
storage circuitry arranged to store an input feature map, convolutional filter data, and an output feature map;
arithmetic logic processing circuitry arranged to:
receive:
a plurality of input work batch data arrays; and
one or more variable-dimension work batch filter data arrays corresponding to partial sections of the convolutional filter data; and
perform convolutions between:
the plurality of input work batch data arrays, and
the one or more variable-dimension work batch filter data arrays corresponding to partial sections of the convolutional filter data,
to produce a plurality of output work batch data arrays which are suitable for being combined to generate the output feature map,
wherein the plurality of input work batch data arrays were generated based at least in part on: the input feature map, one or more dimensional characteristic parameters, and one or more positional characteristic parameters, by control processing circuitry that:
receives:
convolution configuration data relating to the convolution to be performed and comprising a padding setting; and
determines, from the convolution configuration data:
the one or more dimensional characteristic parameters relating to dimensions of each of a plurality of input work batch data arrays corresponding to a convolution to be performed;
the one or more positional characteristic parameters relating to positions of feature map content within the plurality of input work batch data arrays, wherein the positional characteristic parameters comprise at least one delta value that indicates an extent of the input feature map within an input work batch data array, the at least one delta value being determined based at least in part on the one or more dimensional characteristic parameters and a nominal value, the nominal value defined according to a padding setting that indicates at least one of: no extra rows or columns of values are to be added during convolution and one or more padding elements are to be added around the input feature map; and the dimensions of the one or more variable-dimension work batch filter data arrays based at least in part on the input feature map and the convolutional filter data.

* * * * *